(12) United States Patent
Jaspers

(10) Patent No.: US 7,129,976 B2
(45) Date of Patent: Oct. 31, 2006

(54) DIGITAL IMAGE ENHANCING SYSTEM

(75) Inventor: Cornelis Antonie Maria Jaspers, Hapert (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 735 days.

(21) Appl. No.: 10/431,198

(22) Filed: May 7, 2003

(65) Prior Publication Data

US 2003/0227558 A1 Dec. 11, 2003

(30) Foreign Application Priority Data

May 10, 2002 (EP) .................................. 02076851

(51) Int. Cl.
*H04N 3/14* (2006.01)
*H04N 5/217* (2006.01)

(52) U.S. Cl. ...................................... 348/272; 348/241
(58) Field of Classification Search ................ 348/252, 348/255, 224.1, 237, 272, 273
See application file for complete search history.

(56) References Cited

U.S. PATENT DOCUMENTS 6,697,110 B1 * 2/2004 Jaspers et al. .............. 348/272
6,944,337 B1 * 9/2005 Jaspers ........................ 382/167
2002/0158979 A1 * 10/2002 Jaspers ........................ 348/272

* cited by examiner

*Primary Examiner*—Lin Ye
*Assistant Examiner*—Kelly Jerabek
(74) *Attorney, Agent, or Firm*—Aaron Waxler; Paul Im

(57) ABSTRACT

A digital image enhancing system for processing pixel contour data comprises a contour filter, means for edge processing and for local noise reduction to reduce the amount of noise in a pixel luminance or color signal (Sin), means to apply a control signal (Ghpf) indicating the gain of a contour signal, and means to apply a control signal (Gcntr) indicating the gain of the contour as a function of local noise in a picture. The means for edge processing and local noise reduction are arranged such that an output signal (Sout) is supplied in response to said input signal (Sin), to a low pass filtered input signal (Slpf) derived therefrom, and to the contour filter output signal (contour) and the above control signals according to the relation:

$Sout = Gcntr*Ghpf(Sin-Slpf)+Slpf$ if $Gcntr*Ghpf<1$, and $Sout = Sin+(Ghpf*Gcntr-1)*contour$ else.

7 Claims, 33 Drawing Sheets

| 0 | 0 | 1 | 1 | 0 | 0 |
|---|---|---|---|---|---|
| 0 | 2 | 4 | 4 | 2 | 0 |
| 1 | 4 | 9 | 9 | 4 | 1 |
| 1 | 4 | 9 | 9 | 4 | 1 |
| 0 | 2 | 4 | 4 | 2 | 0 |
| 0 | 0 | 1 | 1 | 0 | 0 |

FIG.8

|  | c1 | c2 | c3 | c4 | c5 | c6 |  |
|---|---|---|---|---|---|---|---|
|  | G | ΣG | G | ΣG | G | ΣG | r1 |
|  | ΣG | G | ΣG | G | ΣG | G | r2 |
|  | G | ΣG | G | ΣG | G | ΣG | r3 |
|  | ΣG | G | ΣG | G | ΣG | G | r4 |
|  | G | ΣG | G | ΣG | G | ΣG | r5 |
|  | ΣG | G | ΣG | G | ΣG | G | r6 |

FIG.14 the circles indicate the added pixels

DIGITAL IMAGE ENHANCING SYSTEM

The present invention relates to a digital image enhancing system for processing pixel contour data, comprising a contour filter, means for edge processing and for local noise reduction to reduce the amount of noise in a pixel luminance or color output signal, means to apply a control signal indicating the gain of a contour signal, and means to apply a control signal indicating the gain of the contour as a function of local noise in a picture.

It has already been proposed (see: PHNL000104) to provide such a digital image enhancing system with a specific contour filter by means of which, besides an edge sharpening, the amount of noise in the pixel luminance output signal can be reduced making use of a two-dimensional standard deviation function. Thereby, local noise reduction is realized in combination with serial contour filtering, based on the availability of a luminance signal (Y), i.e. a combination of red (R), green (G) and blue (B) signals. In this case the term "serial" means "after the reconstruction of the luminance signal from the RGB color signals".

In said proposal the contour filter is described by the following relation: Yout=Gcntr*Ghpf*(Yin−Ylpf)+Ylpf, wherein Yin is the input signal of the digital image enhancing system, Yout the output signal thereof and Ylpf the low pass filtered input signal. As the term (Yin−Ylpf) acts as a high pass filter, this term can be considered as being responsible for the specific character of the applied contour filtering. Ghpf is a control signal indicating the gain of a contour signal or, in other words, the amount of contour. Ghpf will be equal or larger then 1. Gcntr is a control signal indicating the gain of the contour as a function of local noise in a picture or, in other words, the amount of local noise; this signal is derived from a measured local standard deviation SD in the input signals, processed within a one or two dimensional pixel array and offered via a membership function to adapt the local noise gain parameter Gcntr for small SD values. Gcntr will be in an interval [0,1].

If Gcntr<1/Ghpf and Ghpf has an arbitrary value equal to or larger than 1, a low pass filtering is realized and, as a consequence, an improvement of the signal-to-noise ratio with respect to the input signal is obtained. If Gcntr=1/Ghpf, then Yout=Yin. If, however, Gcntr<1 and Gcntr>1/Ghpf, then from 1/Ghpf to 1 the amount of contour will be reduced, which also results in less noise in comparison with the full contour signal. If in the latter case Gcntr>1, then the full contour signal and its noise amplification will be added in the ouput signal Yout.

The low pass filter component of the specific contour filter determines the maximum amount of high frequency noise reduction. The low frequency noise remains unaffected. Therefore this method is less suited for reducing the noise in video applications. Due to the temporal character of video, the low frequency noise is well visible, while the high frequency noise is less visible because the human eye averages that noise over several frames. For still pictures however the opposite is true. Low frequency noise is hardly visible while high frequency noise is. This makes the application of local control of sharpness and noise so attractive for still camera applications. As already mentioned the combination of contour filtering and local noise reduction is only available for the specific type of contour filter of the above known type.

As in digital cameras it may occur that a luminance signal is not available, serial contour filtering will not always be possible; than, parallel contour filtering or other contour generating methods may be applied, in stead of serial contour filtering. Such methods are not available in combination with general contour filtering and local noise reduction.

The purpose of the invention is to provide a digital image enhancing system which is not restricted to the application of a specific contour filter, such as a contour filter of the above known type, and which can be used in a particular favorable manner in digital cameras with both serial and parallel contour filtering. The term 'parallel' means that during the reconstruction of the color signals, contour filtering is realized with a specific luminance signal achieved from the RGB sensor signals.

Therefore, in accordance with the invention, the digital image enhancing system, as described in the opening paragraph, is characterized in that the means for edge processing and local noise reduction are arranged such, that an output signal (Sout) is supplied in response to said input signal (Sin), to a low pass filtered input signal (Slpf) derived therefrom, and to a contour filter output signal (contour) and the above control signals, according to the relation:

$$Sout=Gcntr*Ghpf* \ (Sin-Slpf)+Slpf, \text{ if } Gcntr*Ghpf<1,$$
and
$$Sout=Sin+(Ghpf*Gcntr-1)*contour, \text{ else.}$$

Apart from TV applications, this system is particularly applicable for digital still cameras with serial contour filtering in combination with local noise reduction. Edge sharpening in combination with local noise reduction will be possible.

In case a luminance signal is available the letter S can be replaced by Y, while in parallel contour filtering, the letter S can, for example, be replaced by G-ΣG, being a combination of green and sigma green sensor signals, or Ymux, being a signal derived from red and blue sensor signals multiplied with smartgreen parameters.

In a first special embodiment the contour signal is abandoned, i.e. the signal 'contour' is zero, and Ghpf=1. In that case noise reduction in low frequency areas with edge preservation is realized. This embodiment permits local noise reduction without the application of a contour filter. Therefore the invention also relates to a digital image enhancing system for processing pixel data, comprising means for edge preservation and for local noise reduction to reduce the amount of noise in a pixel luminance (Sin), means to apply a control signal (Ghpf) indicating the gain of a contour signal, and means to apply a control signal (Gcntr) indicating the fade position between the luminance signal and a low pass luminance signal as a function of local noise in a picture. Now the system is characterized in that the means for edge preservation and local noise reduction are arranged such that an outputsignal (Sout) is supplied in response to said input signal (Sin), to a low pass filtered input signal (Slpf) derived therefrom and to the above control signals according to the relation:

$$Sout=Gcntr*(Sin-Slpf)+Slpf \text{ if } Gcntr<1, \text{ and}$$

$$Sout=Sin \text{ else.}$$

Apart from TV applications, this system is particularly applicable in digital still cameras for reducing the noise in the RGB color signals.

A second special embodiment concerns edge sharpening with noise reduction in the contour signal only; this means that:

$$Sout=Sin+(Ghpf*Gcntr-1)*contour \text{ if } Ghpf*Gcntr \geq 1,$$
and $$Sout=Sin \text{ else.}$$

Particularly this special case is the only one that can be used in digital still cameras with parallel contour reconstruction with local noise reduction, as in such cameras a high frequency signal Shpf will be used for processing of the RGB color signals, which signal Shpf can easily be defined as Shpf=Sout−Sin. Particularly, the application in digital still cameras can be realized when a minimum value Gcntr(min) of Gcntr is available, which minimum value is chosen such that Gcntr(min)*Ghpf=1 and when the means for edge processing and for local noise reduction are arranged such that an outputsignal (Shpf) is supplied in response to said input signal (Sin), to a low pass filtered input signal (Slpf) derived therefrom, and to the contour filter output signal (contour) and the above control signals according to the relation:

$$Shpf=(Ghpf*Gcntr-1)*contour \text{ if } Gcntr*Ghpf \geq 1 \text{ and}$$

Shpf=0 else.

Apart from TV applications, this system is particularly applicable for digital still cameras with parallel contour filtering in combination with local noise reduction. Edge sharpening in combination with local noise reduction can be obtained.

The invention does not only relate to a digital image enhancing system, but also to a digital camera comprising such a digital image enhancing system.

The invention further relates to an algorithm for processing pixel luminance or color signals in said digital image enhancing system and particularly in said digital camera. The invention also relates to a computer program capable of running on signal processing means in said digital enhancing means, and particularly in said digital camera, and to an information carrier, carrying said computer program.

The invention will further explained by the following description of some preferred embodiments with reference to the accompanying drawings:

FIG. 8 shows the weights of a used 6×6 low pass filter;

FIG. 9 shows the phase mismatch between the standard deviation signal SD derived from the G-ΣG signal and the (black dotted) white compensated luminance signal Yn of the center pixel Yn;

FIG. 10 shows the sensor color signal Ymux (Rs, G, Bs) for the Ylpf (left) and for the SD signal (middle) and the final center position of the SD signal (right);

FIG. 11 shows the realization of the SD signal for a 6×6 array by using a luminance signal Yn;

FIG. 14 shows the realization of the SD signal for a 6×6 reconstruction array with a 4×4 green present array;

FIG. 16 shows a 6×6 array without a green-non-uniformity in the low pass signal using green present signals;

FIG. 21 shows the realization of the SD signal for a 5×5 reconstruction array with G-ΣG color input signals;

FIG. 25 shows the realization of the SD signal for a 5×5 reconstruction array with green present color input signals;

FIG. 27 shows the absence of green-green differences in a low pass filtered signal using green present signals;

FIG. 29 shows a low pass filter for a 5×3 array without green-green differences for both start positions;

Figure 1:
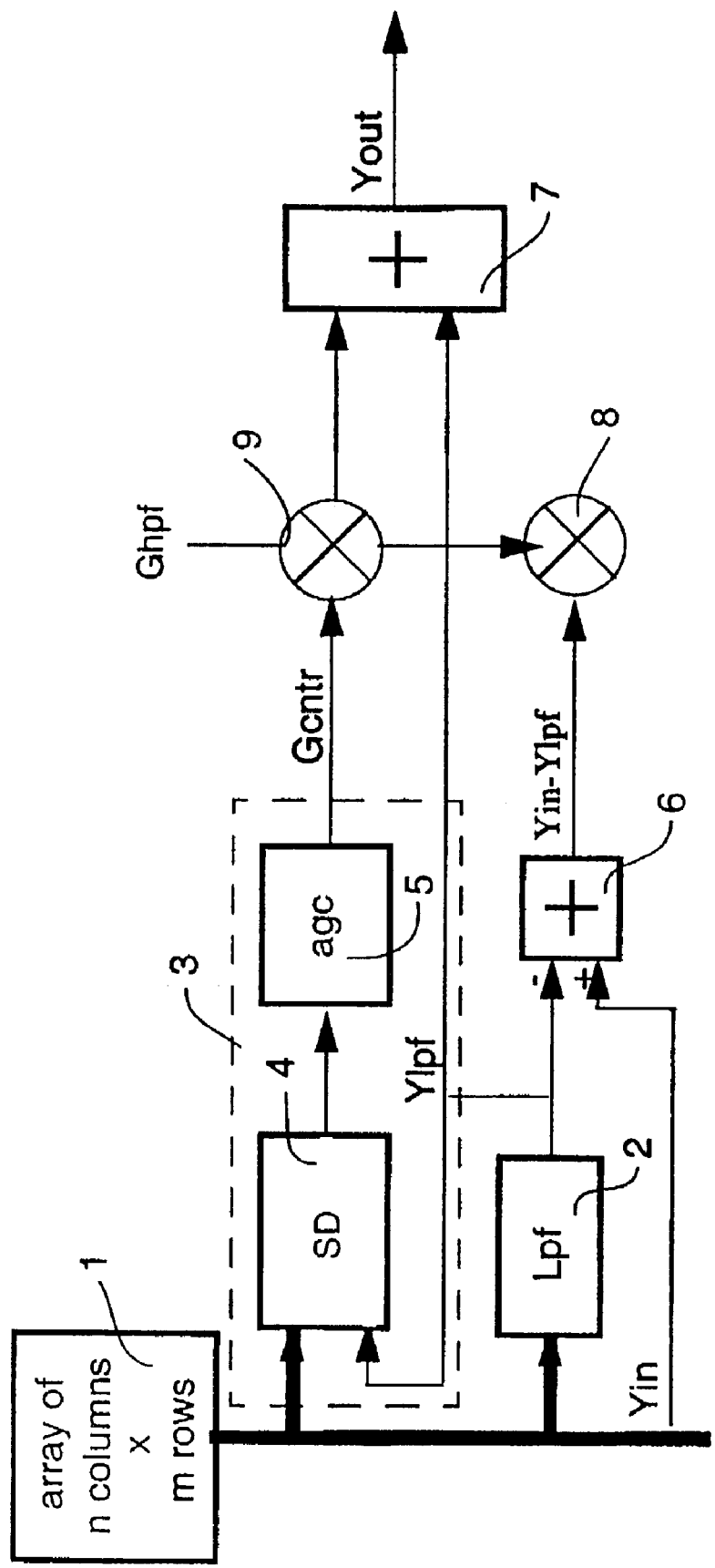
FIG. 1 shows a basis block diagram of a digital image enhancing system according to a former proposal.

The basis block diagram of FIG. 1 shows a digital image enhancing system according to a former proposal, applied in a digital camera. It is supposed that a luminance signal Yin is available; this is not always the case in digital cameras. The image enhancing system comprises an input unit 1 supplying the luminance signals for pixels in an array of n columns and m rows around a pixel to be subjected both to contour enhancement and noise reduction. The luminance signal of the latter pixel is indicated by Yin and forms the input signal of the digital image enhancement system. From the luminance signals in said two-dimensional array a low pass filtered signal Ylpf is derived by averaging said luminance signals in the LPF-unit 2. Further, in a local noise measuring unit 3, from the luminance signals in said two-dimensional array and said signal Ylpf, a correction for the overall automatic gain control signal (AGC) of the camera is derived. The corrected AGC signal is indicated by Gcntr, representing the amount of local noise. This local noise measuring unit 3 comprises a standard deviation unit 4 and a membership function unit 5. The standard deviation unit 4 supplies, in response to the luminance signals of said two-dimensional array and to said signal Ylpf, a signal SD, indicating the standard deviation of the noise in the picture region covered by the pixels in the two-dimensional array. The calculated SD-value is offered to a membership function unit 5, together with an automatic gain control signal AGC. The membership function unit 5 supplies the control signal Gcntr, being the AGC signal adapted for small SD values. The digital image enhancing system further comprises combination units 6 and 7 and multiplication units 8 and 9. These units are arranged such that the luminance output signal Yout of the combination unit 7 is represented by the relation:

$$Yout = Gcntr * Ghpf * (Yin - Ylpf) + Ylpf. \quad (A)$$

As the term (Yin−Ylpf) acts as a high pass filter, this term can be considered as being responsible for the specific character of the applied contour filtering. The combination unit 6 can therefore be considered as a specific contour filter: a signal "contour" can be defined as follows:

contour=Yin−Ylpf. Ghpf($\geq$1) is a control signal indicating the gain of a contour signal or, in other words, the amount of contour to be applied. So, the first term in the relation for Yout is mainly responsible for the contour level and the second term for noise reduction. After substitution of Ylpf in relation (A), the following relation is obtained:

$$Yout = Yin + (Gcntr * Ghpf - 1) * contour.$$

Figure 2:
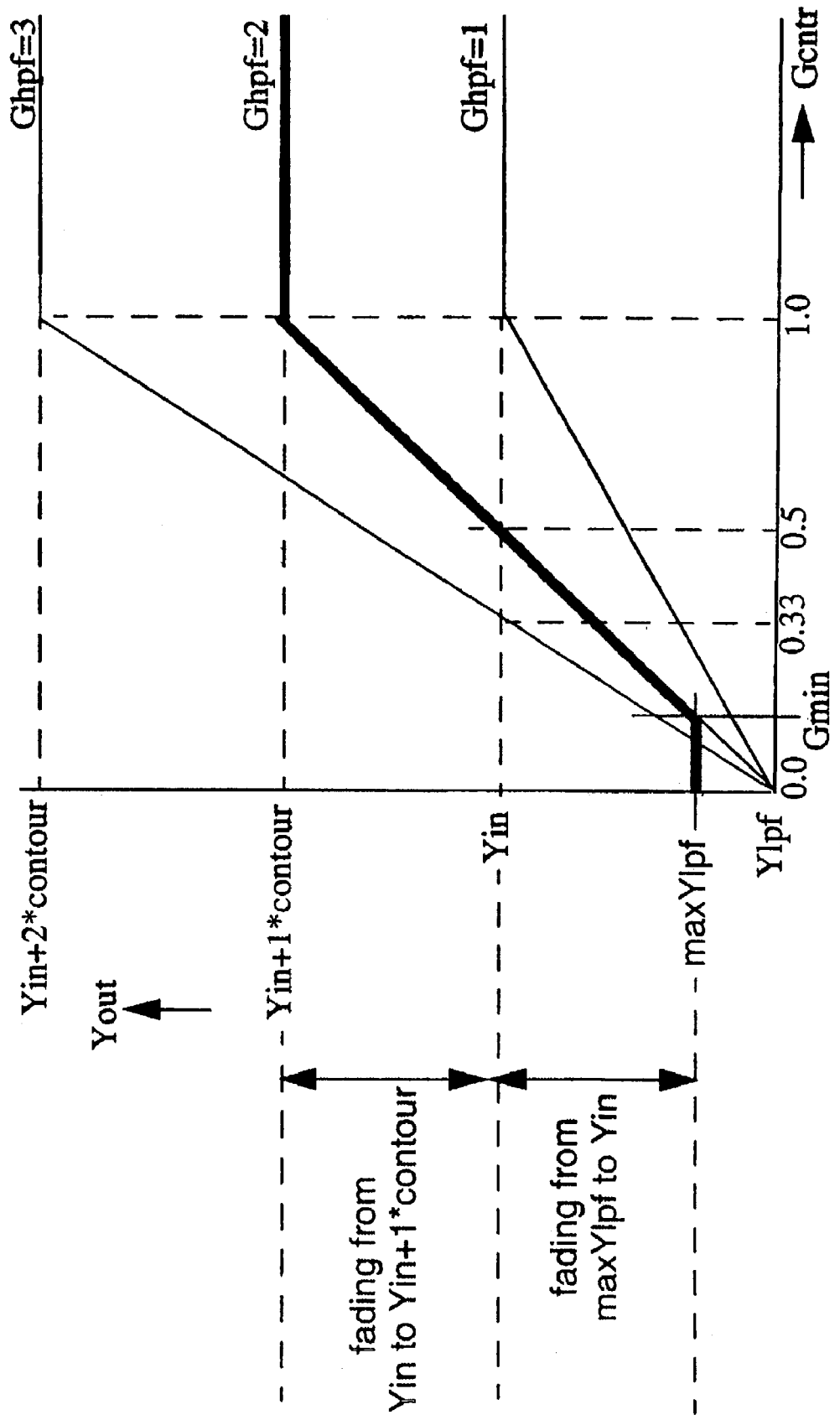
FIG. 2 shows a diagram to further elucidate the operation of the block diagram of FIG. 1.

In FIG. 2 the output signal Yout is shown as function of Gcntr ($\epsilon\{0,1\}$) and, in a bold line, for a value Ghpf=2. If Gcntr<1/Ghpf and Ghpf has an arbitrary value equal to or larger than 1, a low pass filtering is realized and, as a consequence, an improvement of the signal-to-noise ratio with respect to the input signal is obtained. If Gcntr=1/Ghpf, then Yout=Yin. If, however, Gcntr<1 and Gcntr>1/Ghpf, then from 1/Ghpf to 1 the amount of contour will be reduced, which also results in less noise in comparison with the full contour signal. If in the latter case Gcntr>1, then the full contour signal and its noise amplification will be added in the ouput signal Yout.

In practice Gcntr will have a minimum value Gmin. If the value of Gcntr becomes smaller than Gmin, then the fading between the full Ylpf value and Yin is limited to maxYlpf (i.e. the maximum amount of low pass filtering used for the high frequency noise reduction). So, if Ghpf=2, then for Gcntr going from Gmin to 0.5, Yout is faded from maxYlpf to Yin and for Gcntr going from 0.5 to 1.0 or higher is faded from Yin to Yin+1*contour.

According to the invention a digital image enhancing system is provided, in which system, in combination with local noise reduction (LNR), serial contour filtering is applied by means of an arbitrary contour filter, in stead of a specific contour filter as described above with respect to FIG. 1. It is emphasized that serial contour filtering can only be applied if a luminance signal is available. The weights of the luminance signal in case of a standardized TV signal may be according to the following formula: Yin=0.3*R+ 0.59*G+0.11*B. For the realization of serial contour filtering in combination with LNR in digital camera applications it is however allowed to apply arbitrary color contributions in the luminance signal. This is because finally only the high frequency part of the contour signal is added to each of the RGB colors.

Figure 3:
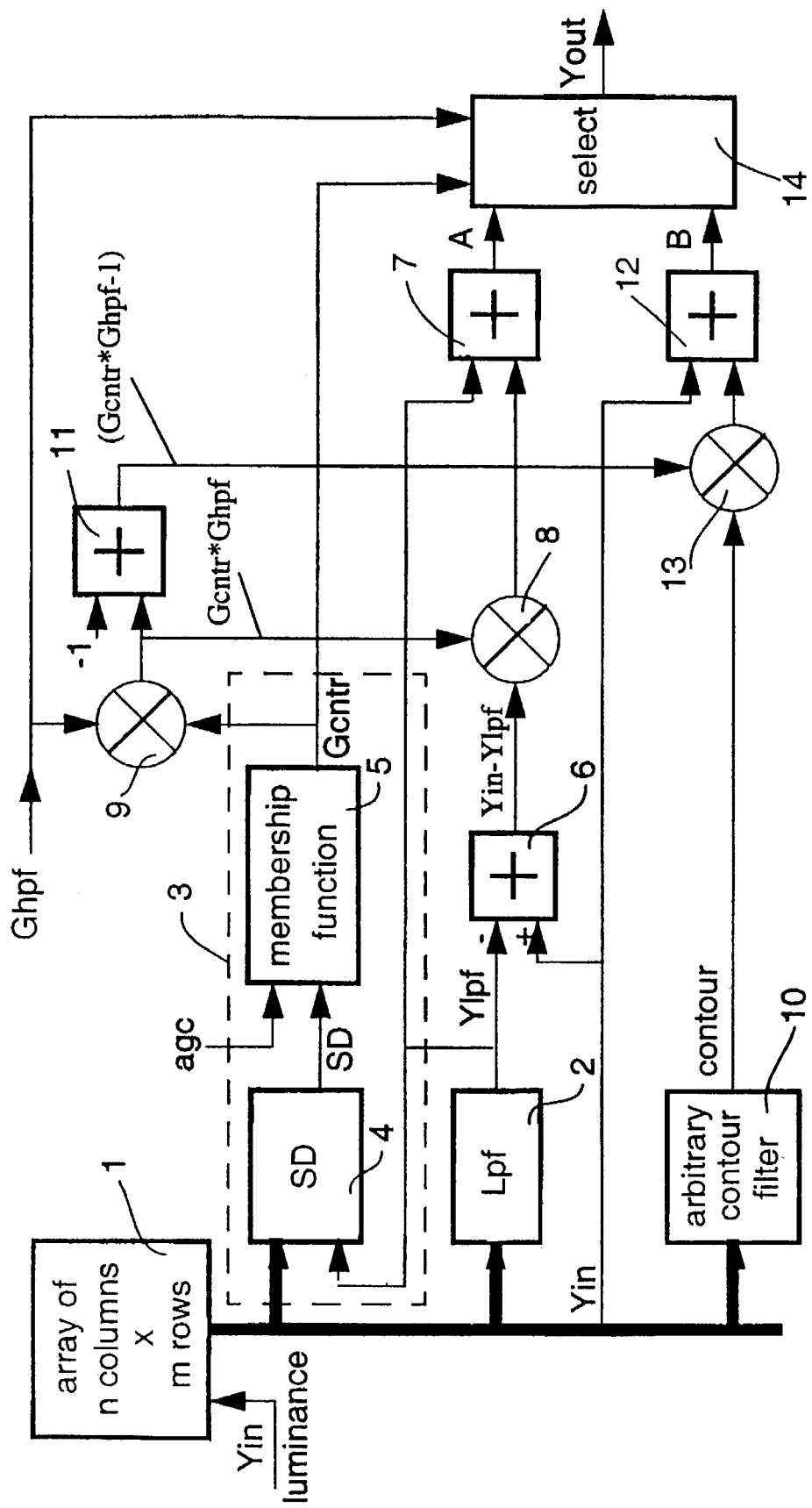
FIG. 3 shows a basis block diagram of a digital image enhancing system according to the invention, applicable in a digital camera with serial contour filtering.

In order to maintain also in this system the function of LNR, the continuous fading, from maxYlpf to Yin+(Ghpf− 1)*contour, as function of Gcntr should be fulfilled. FIG. 3 shows a block diagram of an embodiment of such a system. Apart from the units 1–9, indicated in FIG. 1, this embodiment further comprises an arbitrary contour filter 10, combination units 11 and 12, a multiplication unit 13 and a selection unit 14. The contour unit 10 supplies a signal 'contour', representative of the contour level. These units are arranged such that the luminance output signal Yout of the selection unit 14 is represented by the relations:

$$Yout = Gcntr * Ghpf * (Yin - Ylpf) + Ylpf, \text{if } Gcntr * Ghpf < 1,$$
and $$Yout = Yin + (Ghpf * Gcntr - 1) * contour, \text{ else.} \quad (B)$$

Just like the system of FIG. 1, which uses a specific contour filter, this system for LNR in combination with contour filtering by means of an arbitrary contour filter is able to reduce the high frequency noise in low frequency areas of the final luminance output signal, while the sharpness of the edges can be improved.

In the following two special cases of this general case of local noise reduction will be described.

a) The first one concerns noise reduction in low frequency areas with edge preservation and uses the final luminance or color signals. In this case no further edge sharpening will be applied.

b) The second one concerns edge sharpening with noise reduction in the contour signal only. It will be explained that this special LNR case is the only one that is applicable in digital still cameras using a parallel contour reconstruction and not the one described with reference to FIG. 3.

Case a) is intended for noisy still pictures where the only goal is the reduction of the noise and the preservation of the existing edges without adding extra contour. The mathematical relation for this edge preserving noise reduction is as follows:

$$Yout = Gcntr * Ghpf * (Yin - Ylpf) + Ylpf \text{ if } Gcntr < 1/Ghpf$$
and $$Yout = Yin \text{ else} \quad (C)$$

Figure 4:
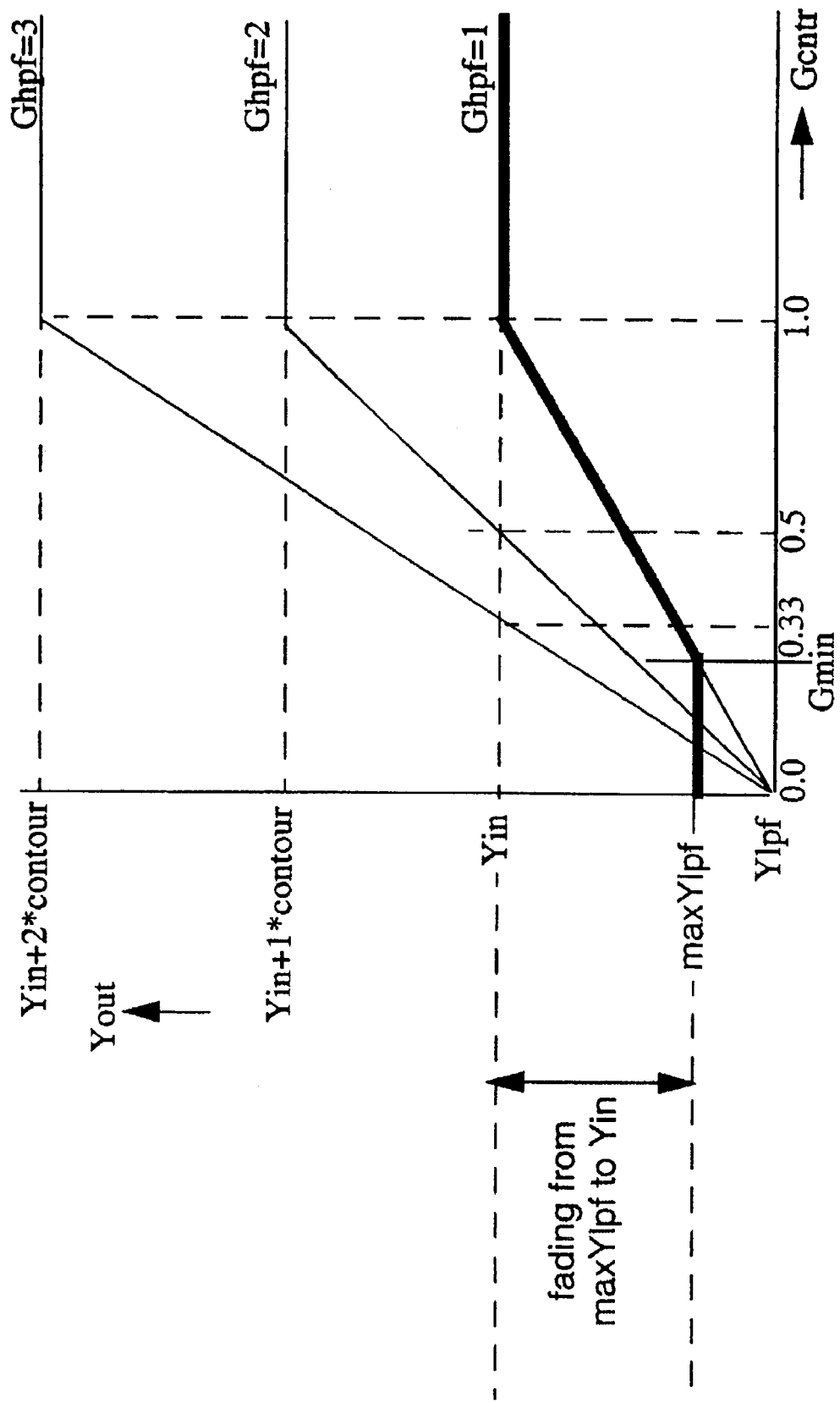
FIG. 4 shows a diagram to further elucidate the operation of the block diagram of FIG. 3 in the special case of local noise reduction with edge preservation.

This relation is derived from relation (B) with the contour signal equal to zero. In FIG. 4 the output signal Yout for this case is shown as function of Gcntr and, in a bold line, for a value Ghpf=1. If Gcntr*Ghpf>1, then Yout=Yin, so that no edge sharpening or contour improvement will be reached; only edge preservation will be reached in combination with noise reduction. Later on an example will be given of noise reduction with edge preservation in a smartgreen3 environment.

Figure 5:
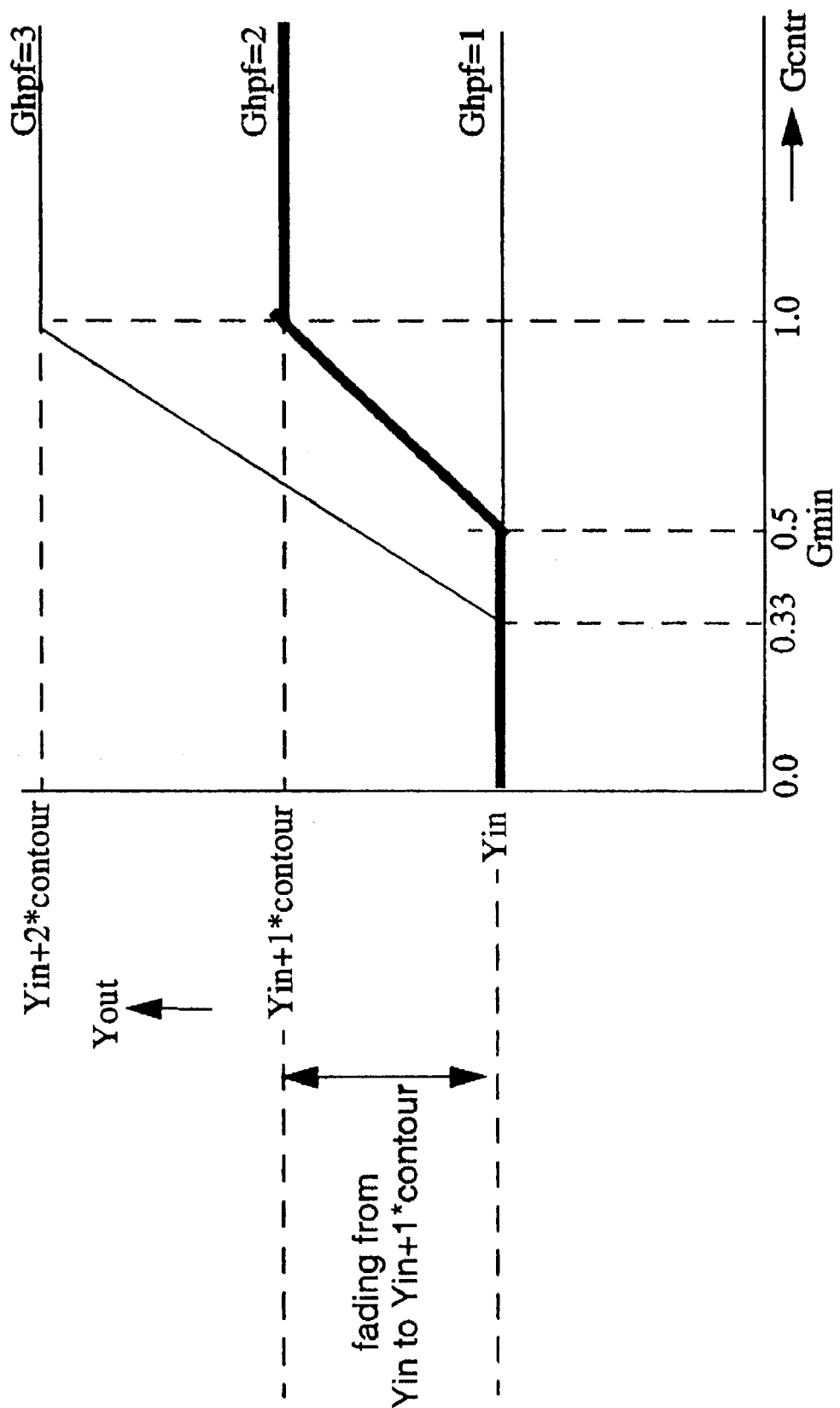
FIG. 5 shows a diagram to further elucidate the operation of the block diagram of FIG. 3 in the special case of edge sharpening with noise reduction only in the contour.

In Case b) a Gmin (minimum value of Gcntr) parameter is increased so that the influence of the low pass filter, and as a consequence the noise improvement in the output signal, is decreased. A special case occurs when Gmin becomes 1/Ghpf as is shown in FIG. 5 for Ghpf=2 (bold line). In that case the low pass filter Ylpf is not applied at all. It is allowed then to replace Ylpf in relation (B) by Yin. The mathematical relation for this special transfer is as follows:

$$Yout = Yin + (Ghpf * Gcntr - 1) * contour \text{ if } Gcntr \geq 1/Ghpf,$$
and $$Yout = Yin \text{ else.} \quad (D)$$

A reason to apply this transfer characteristic is when so called 'plastic faces' have to be avoided. This phenomenon is caused by the loss of small scene details due to the noise reduction. Because the human eye is very sensitive for human faces, the loss of details was noticed as unnatural looking plastic faces. In case of digital still cameras using parallel contour reconstruction, there is, however, a much more important reason to apply relation (D) for Yout, viz. that in certain circumstances it is necessary to obtain the value Yhpf for further processing as will now be described.

A characteristic of LNR is the ability to offer noise reduction due to the fact that its final output signal uses the full bandwidth. At a first glance the high frequency component can be retrieved again by subtracting the input signal Yin from the output signal Yout of FIG. 3: Yout−Yin=Yhf. The noise energy of the input signal Yin can be splitted into two noise energy components: $ns_{lf}^2$ and $ns_{hf}^2$, respectively a low and a high frequency effective noise component. The sum of both represents the total noise energy of Yin. The low frequency noise energy $ns_{lf}^2$ is supposed to be present in the output signal Yout of the local noise reduction system when Ylpf is selected. Because in normal scenes low frequency areas are dominating the high frequency ones and because $ns_{lf}^2$ is smaller than the total noise of Yin, $ns_{lf}^2$ represents the noise improvement that the local noise reduction system can offer.

When, however, Yin is subtracted again from the output signal with improved noise, then, because it is correlated noise obtained from the same source, the high frequency noise energy will be left in the Yhf output signal according to: $ns_{lf}^2 - (ns_{lf}^2 + ns_{hf}^2) = -ns_{hf}^2$. So, in spite of the local noise reduction, the noise improvement will be undone. So, a desired noise reduction is only possible if the full bandwidth output signal of the local noise reduction system is used as final signal that should not be processed further. Therefore, instead of the above relation Yhf=Yout−Yin, the following relation, derived from relation (D), is used:

$Yhpf = (Ghpf * Gcntr - 1) * contour$ if $Gcntr * Ghpf \geq 1$ and $Yhpf = 0$ else. (E)

Figure 6:
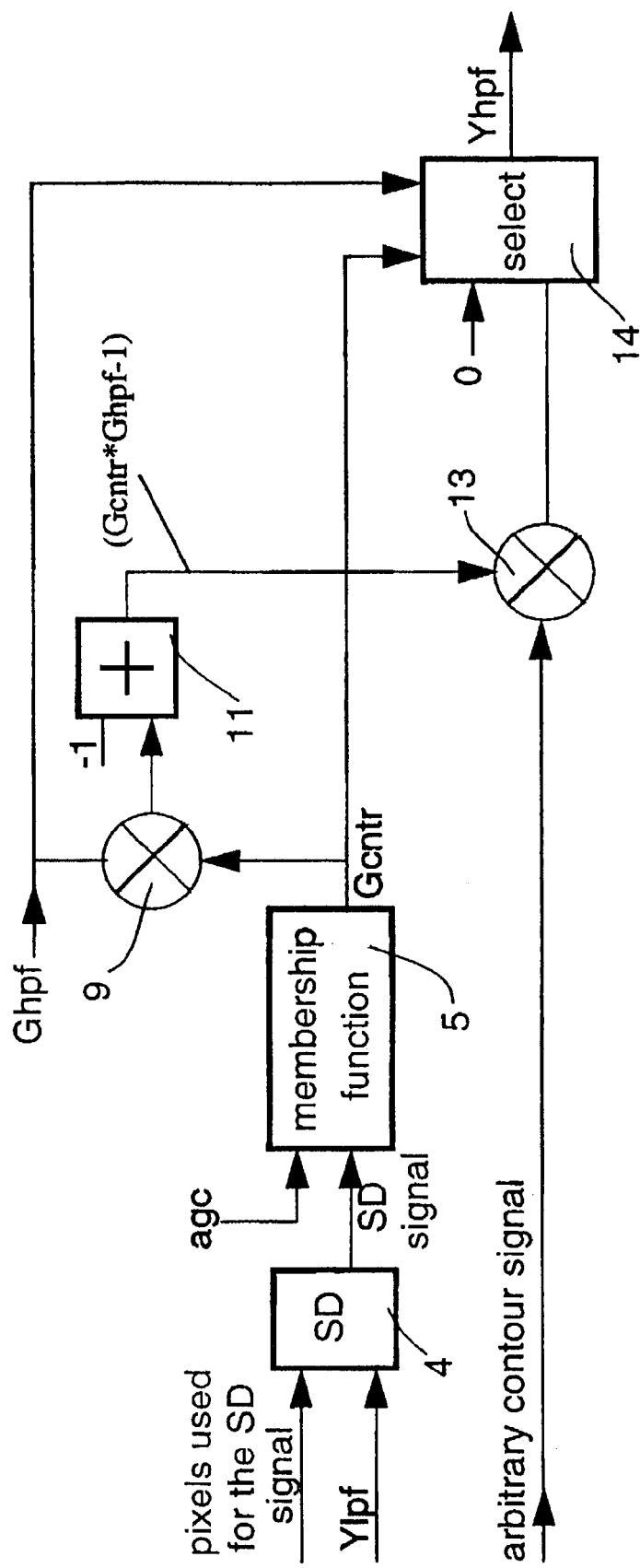
FIG. 6 shows a basic block diagram of a digital image enhancing system according to the invention, which can be applied in a digital camera with parallel contour filtering.

FIG. 6 shows a basis block diagram for this embodiment, containing the units 4, 5, 9, 11, 13 and 14 mentioned before and coupled such that relation (E) is realized. This embodiment is particularly suitable for LNR in digital still cameras using parallel contour filtering. Supposing that the arbitrary parallel contour filter output signal is available, the only signal that needs to be realized is the standard deviation SD, from which Gcntr can easily be obtained by means of a simple membership function.

It may be noticed that subtracting the input signal Yin from the output signal Yout obtained as illustrated in FIG. 3, does not cause a malfunctioning local noise reduction. The only points are that it does not offer the expected signal-to-noise improvement in low frequency areas and that it is unnecessarily complex in comparison with the embodiment of FIG. 6.

Figure 7:
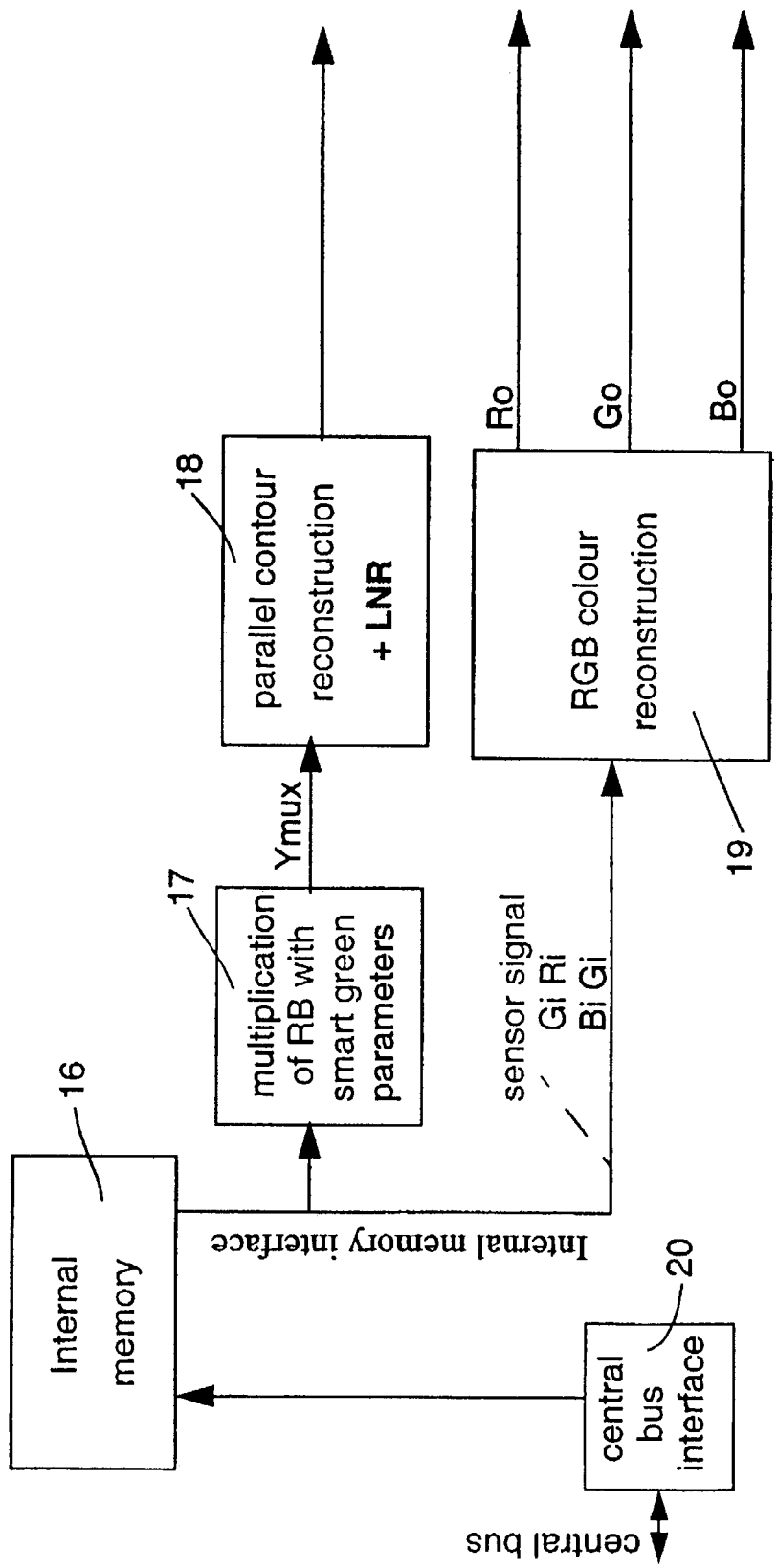
FIG. 7 shows a block diagram of a part of a digital camera with a Bayer reconstruction filter and arbitrary parallel contour filtering in combination with local noise reduction.

FIG. 7 shows a block diagram of a part of a camera with a Bayer reconstruction filter and an arbitrary parallel contour filter with LNR. Whether it is a memory based architecture or not is not relevant for the available signals. The system comprises a central bus interface 15 and an internal memory 16 to supply the well known Ri, Gi and Bi sensor color signals, a unit 17 for multiplicating the Ri, Bi signals with the smart green parameters, a unit 18 comprising the digital image enhancing system according to the embodiment of FIG. 6, which, in response to a signal Ymux, generates the output signal Yhpf, and the RGB color reconstruction filter 19 which, in response to the multiplexed Ri, Gi, Bi input signals, generates the color output signals Ro, Go and Bo. The unit 18 with the digital image enhancing system according to the invention is operable parallel to the color reconstruction filter 19. The signal Ymux is also a sensor color signal, but with Ri and Bi multiplied by the smartgreen parameters. So, the input signals of the unit 18 are the red and blue signals SmartGcntrlR*Ri and SmartGcntrlB*Bi respectively and the green signal Gi. In stead of Ymux also the white compensated luminance signal Yn can be used. This signal is derived by interpolation from the white compensated Bayer array.

Given those signals and the LNR for an arbitrary parallel contour filter as indicated in FIG. 6, some rules can be defined:
1. The SD signal is a differential signal, so it should never contain DC values. This means that the same source signal should be applied for the used pixels of the SD signal and its low pass filter.
2. The phase of all signals, i.e. Yin, Yout, contour, SD and Ylpf, should match with the convolution center of the reconstruction array.

Green-green differences in the Ylpf signal and also in the pixels used for the SD signal should be prevented because otherwise a regular modulation in low frequency scene areas will occur.

Given those rules, in the following the system according to the invention explained for respectively a 6×6 smartgreen3 reconstruction array and for a 5×5 and 5×3 reconstruction array.

First it will be examined which of the available signals, mentioned before with reference to FIG. 7, is suited for the realization of the SD signal of a 6×6 reconstruction array. FIG. 8 shows for such an array the weights of a low pass filter that is free of green-green differences independent of the used available signals mentioned before. The signal for the low pass filter depends however on the choice of the pixels for the SD signal.

In a first choice of available signals, as indicated in FIG. 9, a G-ΣG (a combined green, sigma green) signal in a 6×6 array is shown. Realizing Ylpf with that signal, using the weights of FIG. 8, offers the desired phase match with the white compensated center pixel signal Yn. In FIG. 9 this center pixel Yn is indicated by a black circle. The problem is however that there is no suitable column or row that offers pixels for the SD signal matching with Yn. There are no pixels for the SD signal available between column c3 and c4 and between row r3 and r4. This makes the G-ΣG signal not very attractive for the realization of the desired standard deviation SD signal.

Figure 10:
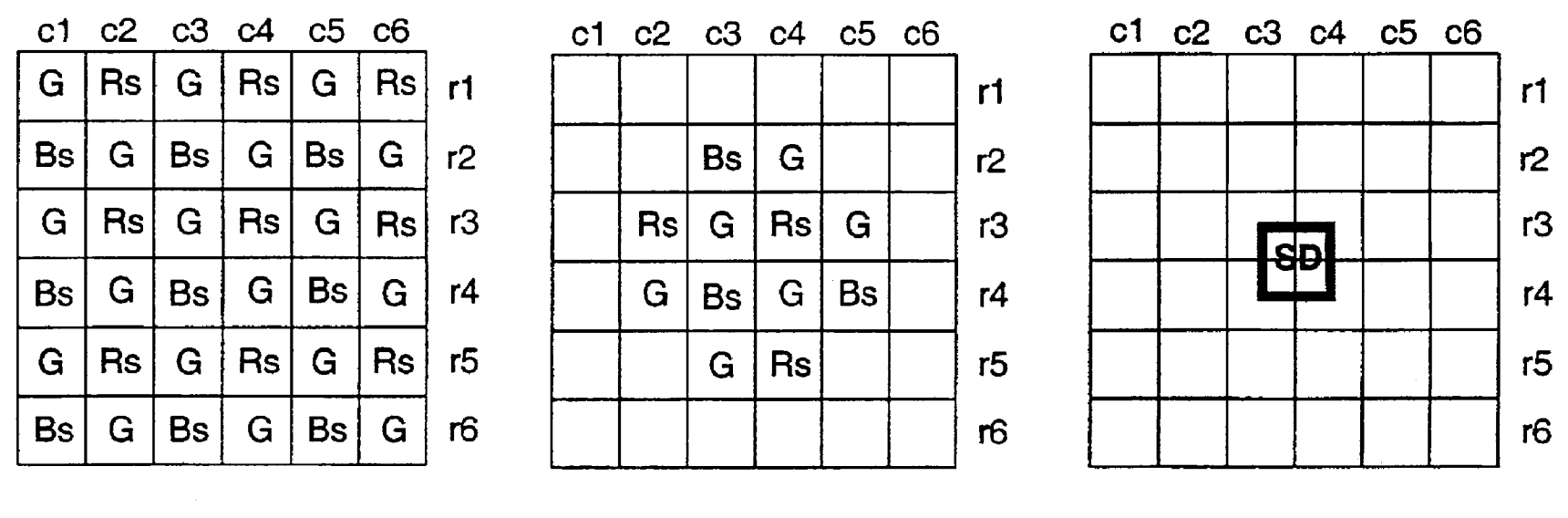

In a second choice a full 6×6 array, filled with the Ymux signal as shown on the left side of FIG. 10, is used for the realization of the Ylpf signal. This results in a proper phase match with the center pixel signal Yn. It may be noted that Ymux is composed of Rs=wbr*Ri, Gs=Gi and Bs=wbb*Bi with wbr=SmartGcntrlR and wbb=SmartGcntrlB. For the SD signal the Ymux pixels are used as shown in the middle of FIG. 10, finally resulting in an SD signal having a proper phase with Yn (on the right side).

A problem occurs however in colored areas. The SD signal should be a differential signal without any DC information. When the Ymux pixels are used for the SD signal, a color dependent modulation of Ymux occurs due to dc errors.

Figures 11, 16:
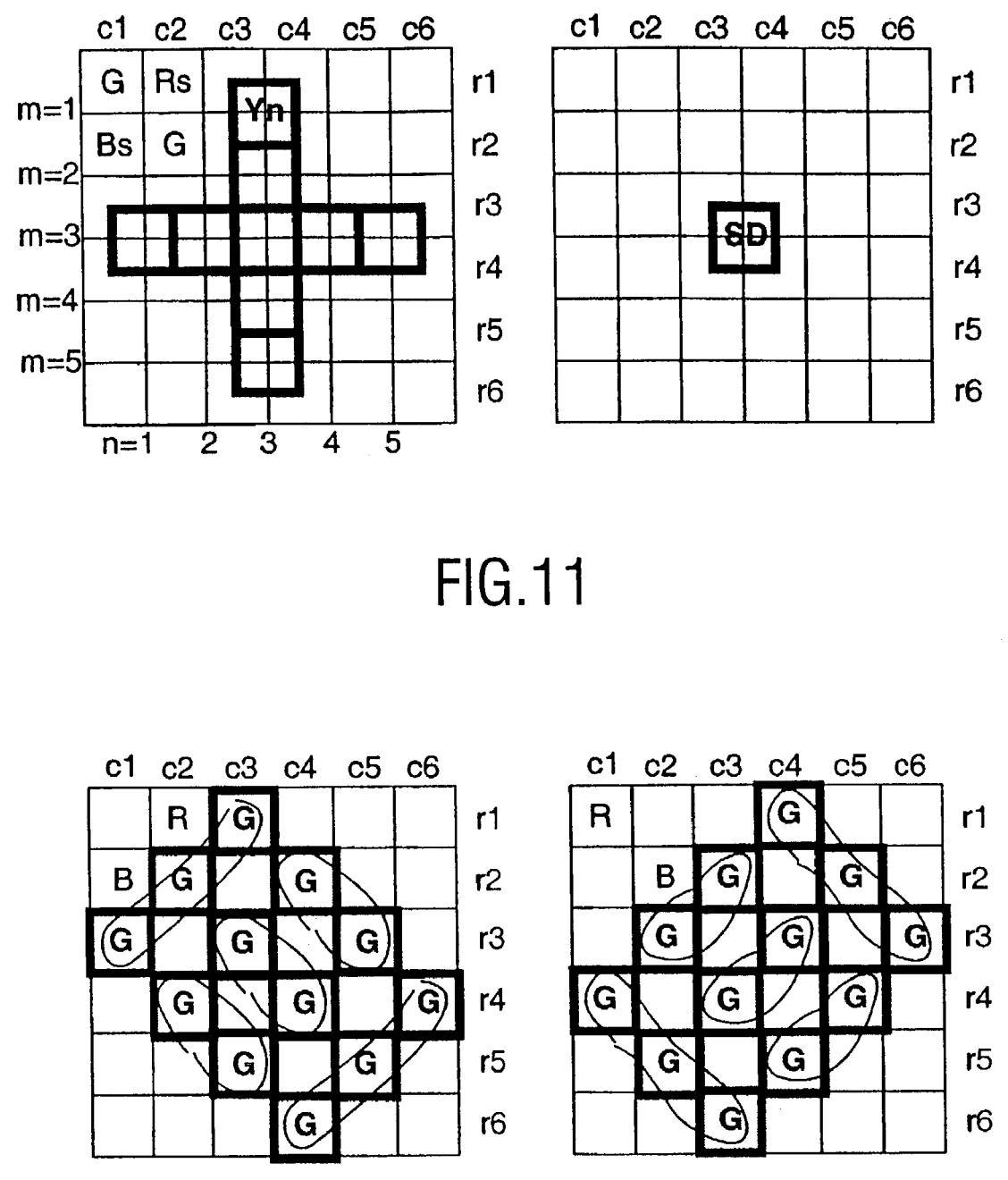

Now a third choice for an 6×6 array will be considered. Based on the first and second choice, described above, the next logical step is the use of center pixels Yn for the SD signal. On the left side of FIG. 11 is illustrated how a centered cross of 5×5 pixels Yn is realized from the Ymux signal. For each desired Yn pixel, four input pixels (using a 2×2 Yn-array) are added together. So for the upper Yn pixel the data in columns c3 and c4 of row r1 and r2 are added and next divided by four. The nine generated Yn pixels (printed bolt in FIG. 11) are used for the calculation of the standard deviation SD. On the right side of FIG. 11 is shown that this SD signal has a perfect phase match with the Yn-signal, because with the addition of unity weighted pixels of an odd by odd array, the center position is maintained.

The algorithm for this SD proposal is as follows:

{the standard deviation is calculated for n=5 horizontal and m=5 vertical center pixels, see left side of FIG. 11}

| | |
|---|---|
| SD=0 | { reset SD to zero } |
| for m=1 to 5 do | { SD in vertical direction } |
| SD=SD+abs(Ylpf−Yn[3,m]) | { Yn as input signal } |
| for n=1 to 5 do | { SD in horizontal direction except } |
| if n<>3 then | { center pixel, already used in V-direction } |
| SD=SD+abs(Ylpf−Yn[n,3]) | |
| SD=2*SD/9 | { amplitude adaptation of SD } |
| if SD>maxSD then SD=maxSD | { limit amplitude of SD to maxSD } |

Figure 12:
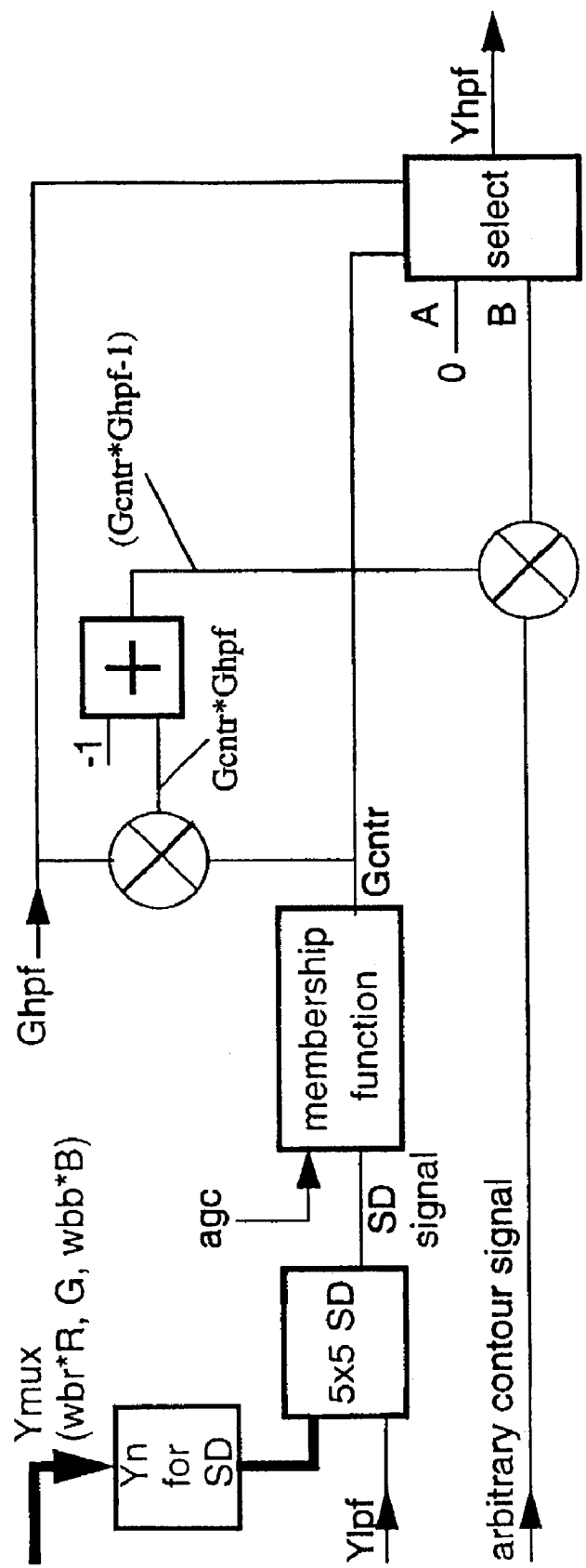
FIG. 12 shows a block diagram of the image enhancing system according to the invention for a 6×6 smartgreen3 array using a luminance signal Yn for generating the SD signal.

In FIG. 12 the block diagram of this 6×6 LNR array is shown, which array can be applied for a smartgreen3 reconstruction method. This block diagram is partly identical to that of FIG. 6. However, on the left side, from the top to the bottom the used input signals are:

the Ymux signal,
the existing low pass filtered signal Ylpf,
the existing arbitrary contour signal.

All signals are free of green-green differences.

Figure 13:
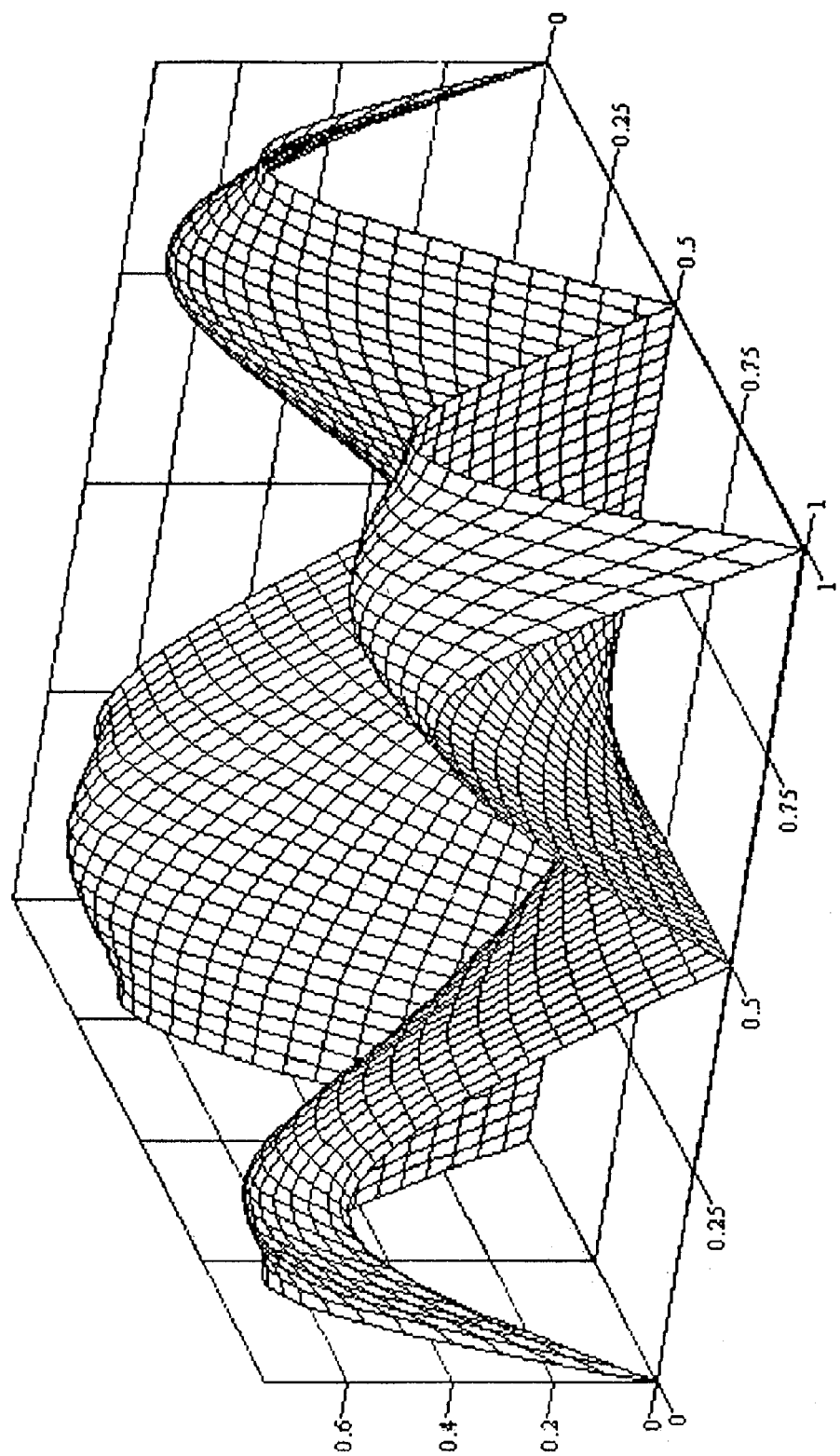
FIG. 13 shows a 6×6 transfer characteristic using the luminance signal Yn for generating the SD signal.

FIG. 13 shows the SD transfer characteristic when using Yn. Due to the 2×2 Yn array, the maximum SD amplitude is much smaller than unity. This is however not important for the LNR because:

a) the membership function only uses SD values close to zero, i.e. close to the noise floor,
b) the influence of the Yn transfer characteristic at the low frequencies in the four corners (0,0; 1,1 etc.) can be neglected.

Just like the LNR, described before with reference to FIG. 3, this 6×6 LNR array has a center signal for which count that: Yn=(wbr*R+2*G+wbb*B)/(wbr+2+wbb). Whether this is a real advantage or not will be explained later on.

Figure 14:
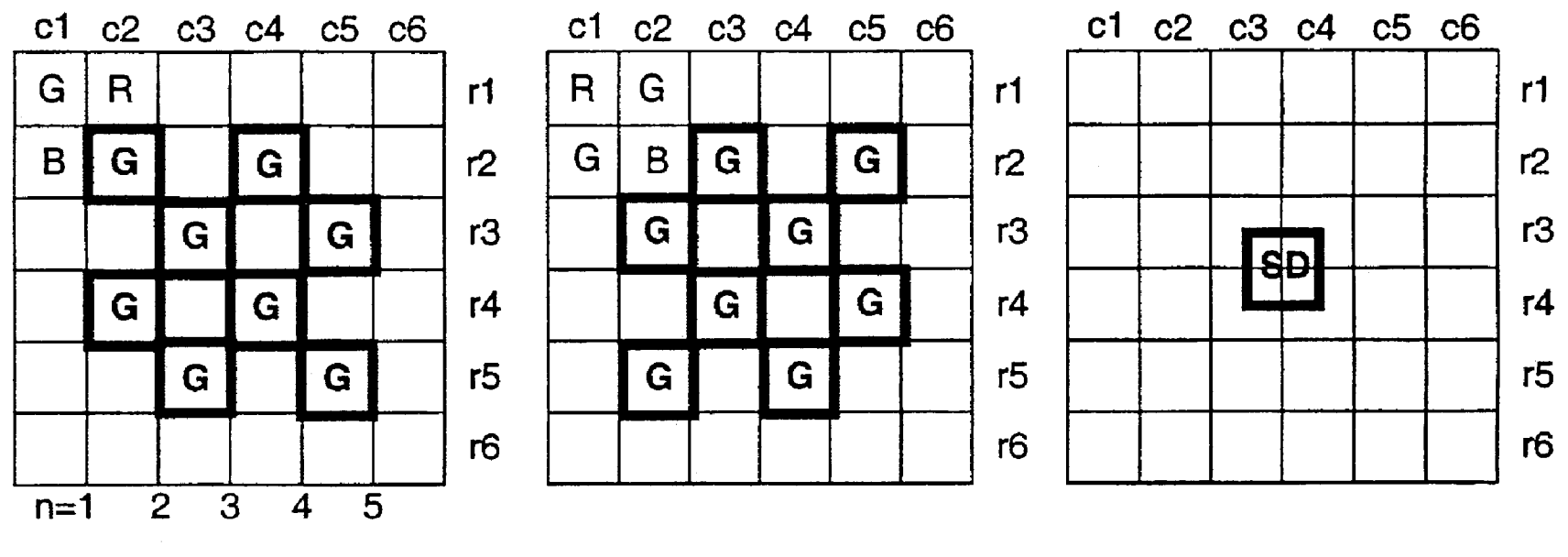
Figure 15:
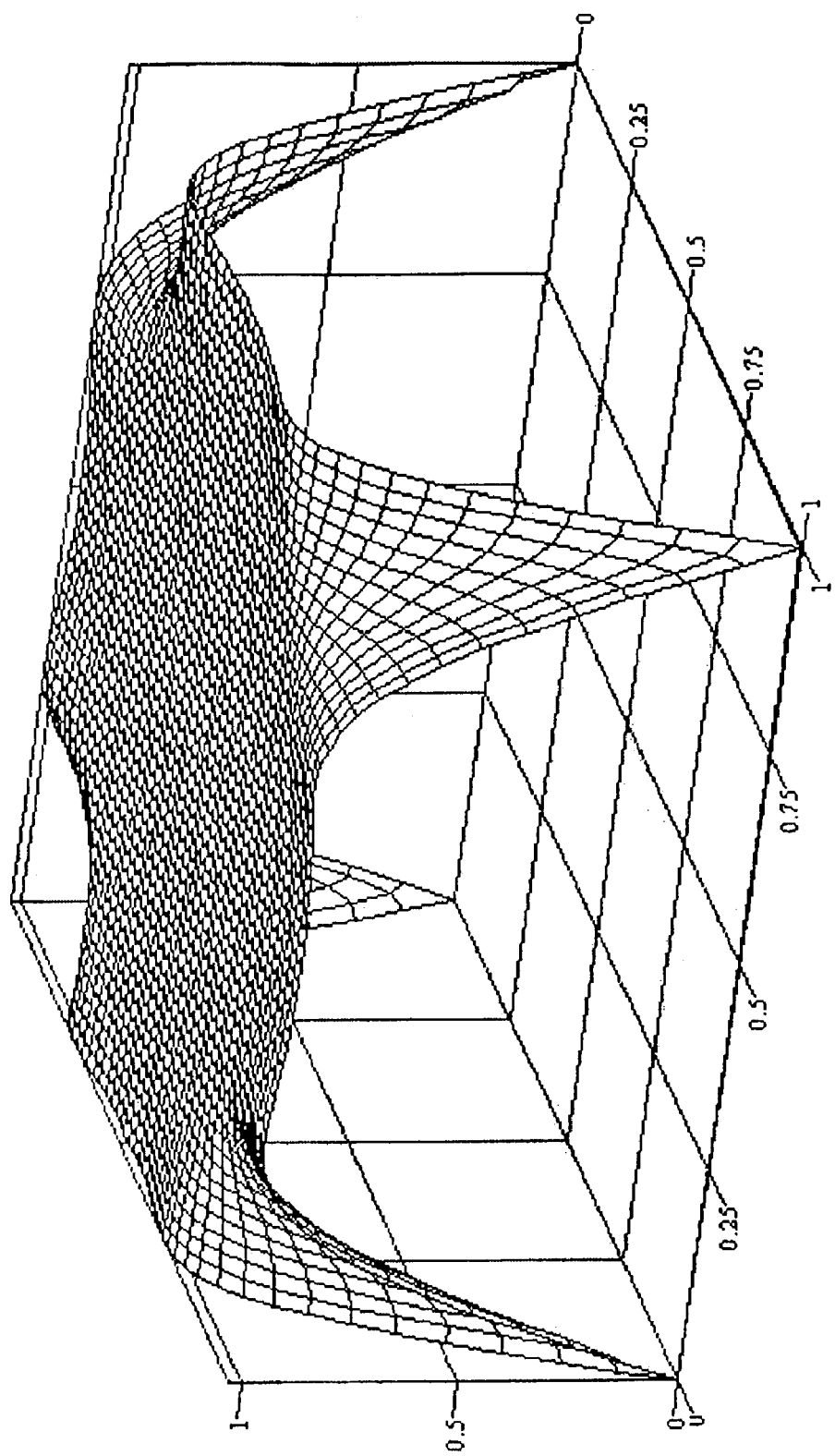
FIG. 15 shows a 6×6 transfer characteristic using 4×4 green present signals for generating the SD signal.

Another aspect to pay attention to is the zero throughput at the Nyquist frequency (0.5*fs) in FIG. 13, where fs is the sample frequency. This means that the LNR, besides the contour noise (according to FIG. 6), also will reduce the contour amplification of frequencies near the Nyquist border. The resolution loss with Yn for SD can be prevented when using 8 present green pixels as indicated in FIG. 14, showing a fourth choice in which a 6×6 array with the green present pixels is used. For both start positions GR (left) and RG (middle) the resulting SD is the same, with a proper phase match to the center of the array; the final center position of the SD signal is shown on the right side in the FIG. 14. The low pass filtered signal Ylpf is realized with the same present green signal but then available over the full 6×6 array. The Ylpf signal as well as the final SD signal, using the shown green pixel configuration, are free of green-green differences. For the pixels used for the SD signal count rule 2 mentioned before. The SD transfer characteristic with a 4×4 G-present signal is shown in FIG. 15 and can be regarded as an ideal characteristic.

In FIG. 16 the circled combinations at the two start positions GR (left) and RG (right) show that there are no green-green differences, taking into account the given filter weights of FIG. 8.

Figure 17:
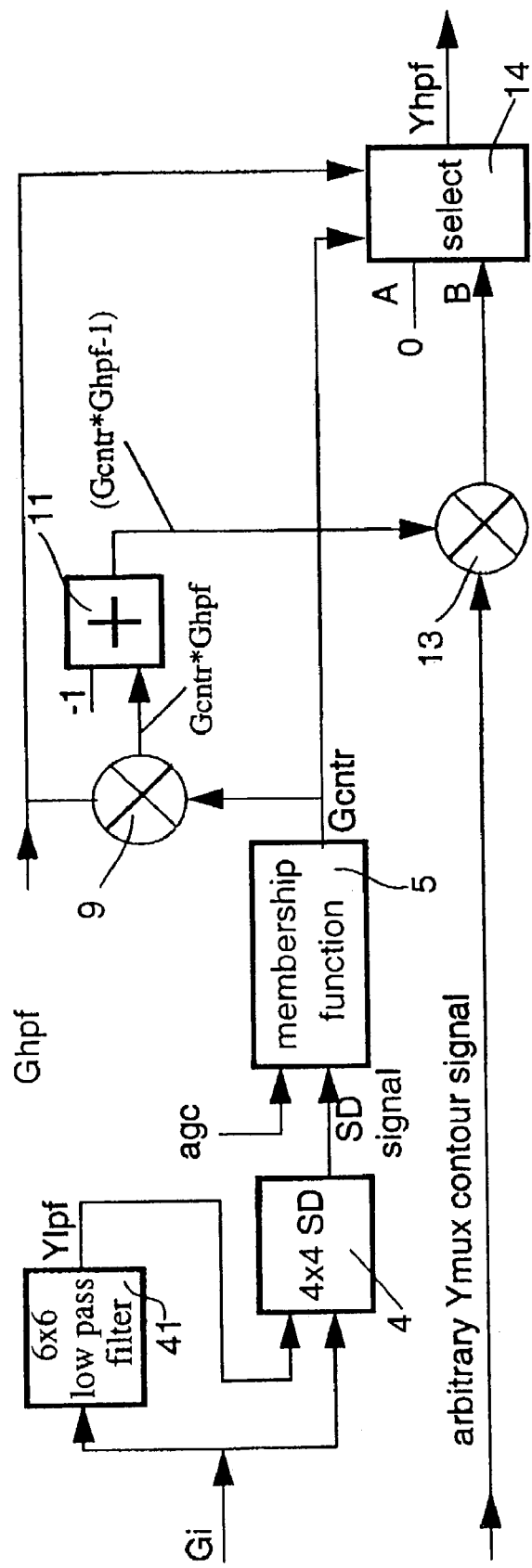
FIG. 17 shows a block diagram of an image enhancing system according to the invention for a 6×6 smartgreen3 array using a luminance signal Yn for generating the SD signal.

In FIG. 17 the block diagram for this LNR array is shown, using Gi (G-present) as input signal for the calculation of the standard deviation SD on the same way as indicated in FIG. 6. Apart from the low pass filter 41 this block diagram contains the same units as in FIG. 6.

For the four previous choices the following conclusions can be drawn:

The G-ΣG signal does not have a proper phase match with the center Yn signal and is not suited.
The Ymux signal has a DC offset in colored areas and is not suited.
The Yn signal is suited, but causes a slightly visible contour signal resolution loss near 0.5*fs. Within the Yin signal all colors are available for noise reduction.
The use of the present green signal for LNR offers a flat SD transfer characteristic near the Nyquist zone. In case of a sensor with a (near) unity matrix, no other colors then green are represented. With a heavy matrix the green signal from the sensor will contain information from red and blue light as well, through which it is acting like a luminance signal.

For the third choice can be concluded that when the outer Yn pixels of FIG. 11 are not applied, their total for the SD signal becomes 5 in stead of 9, then those five Yn pixels can also be used for a 4×4 reconstruction array. For the fourth choice, FIG. 15, can be concluded that the G-present method is also suited for a 4×4 reconstruction array. In the low pass filtered G-present signal no green-green differences occur. For the third and fourth choice count that no increase of the size of the 6×6 array is required, as for example would be the case when the ΣG signal had been applied over the full 6×6 array. Then the array size would increase to 8×8.

Till so far LNR is executed on the smartgreen3 contour signal. As will be shown later on it is also possible to execute LNR on the total of the smartgreen3 high frequency signals.

Now local noise reduction with a 5×5 reconstruction array will be considered.

Assumed is that for a 5×5 reconstruction array a 5×5 parallel aliasing free contour will be applied. First an appropriate low pass filter will be defined with the same characteristics as the one of the 6×6 smartgreen3 array. This means no high frequency artifacts, no color modulation and no green-green differences will occur. This filter has been realized by adding 2×2 unity low pass filters within the 5×5 area, starting in the middle. Consequently adding 2×2 unity low pass filters guarantees the above mentioned characteristics. Besides that is noticed that in case of Ymux the RGB ratio in the low pass filtered signal is 1:2:1.

Figure 18:
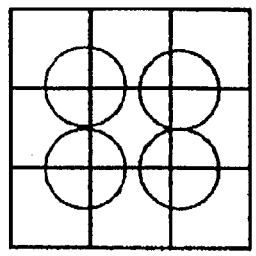
FIG. 18 shows the adding of pixels for the construction of a low pass filter.

By going around the center and adding 4 times a 2×2 unity array in a 3×3 area, the low pass filter indicated in FIG. 18 (right) is the result. The circles on the left side in FIG. 18 indicate the added pixels. This filter is the best 3×3 reconstruction filter of smartgreen3. Continuation of adding 2×2 unity arrays over the 5×5 array results in a low pass filter as indicated in FIG. 19.

Figure 19:
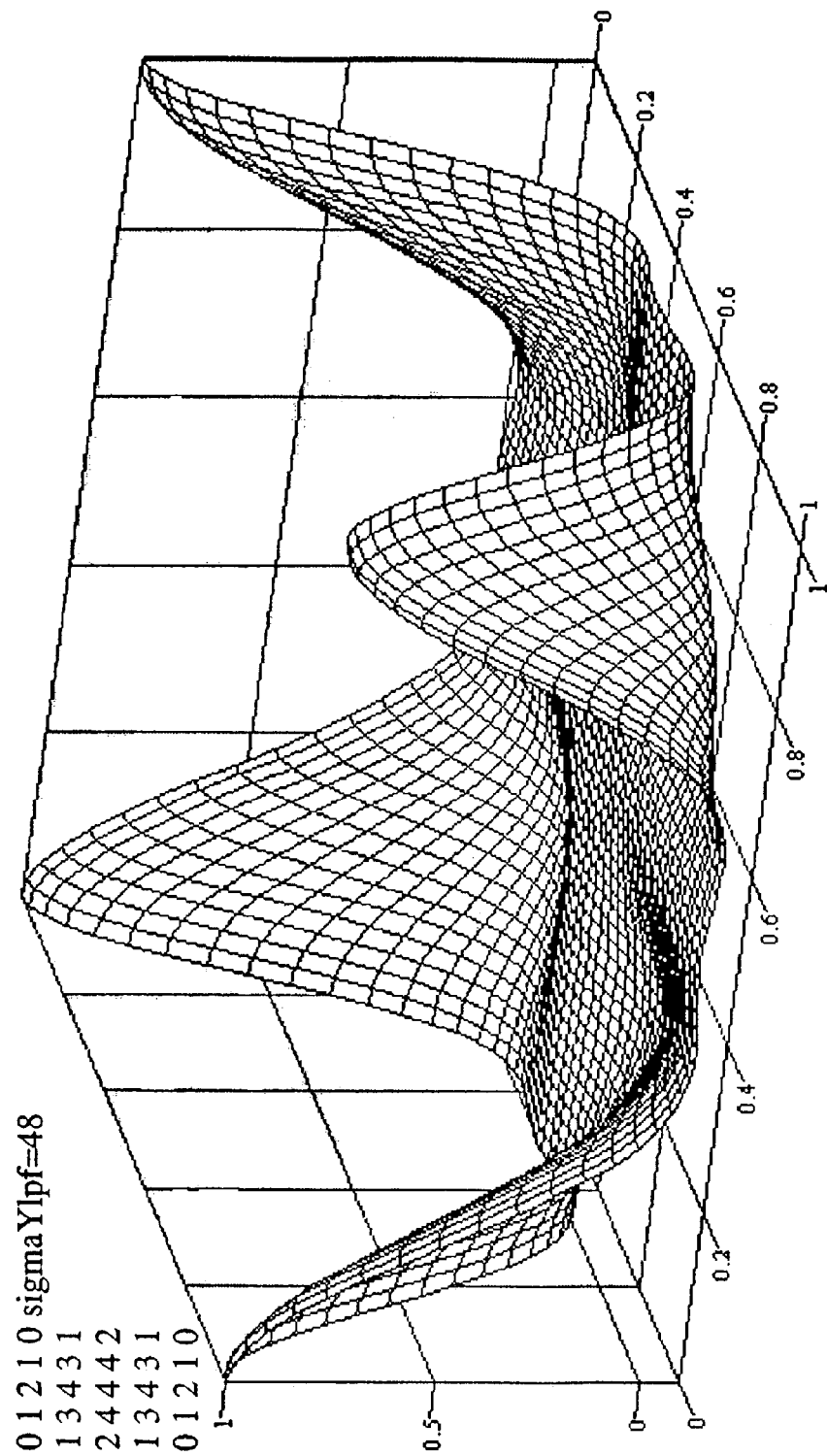
FIG. 19 shows a first low pass filter characteristic for a 5×5 reconstruction array.

A second and better, i.e. a more flat filter can be obtained by adding the weights of the filters in the FIGS. 18 and 19. This filter, shown in FIG. 20 will be applied in the 5×5 LNR array.

Now the same available signals for generating an SD signal will be regarded as used in case of the choices 1–4 in the 6×6 LNR array.

Figure 20:
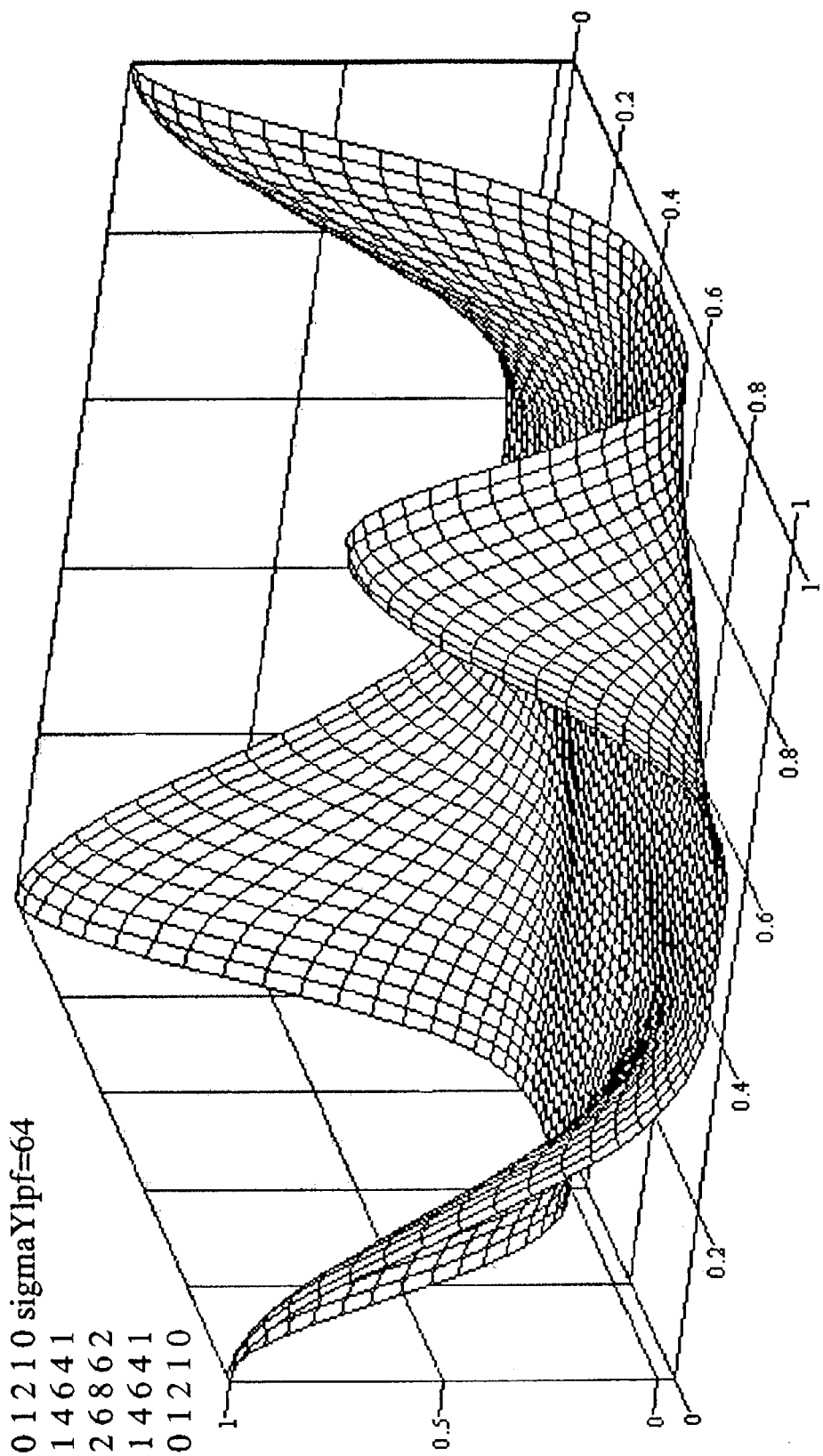
FIG. 20 shows a second low pass filter characteristic for a 5×5 reconstruction array.
Figure 21:
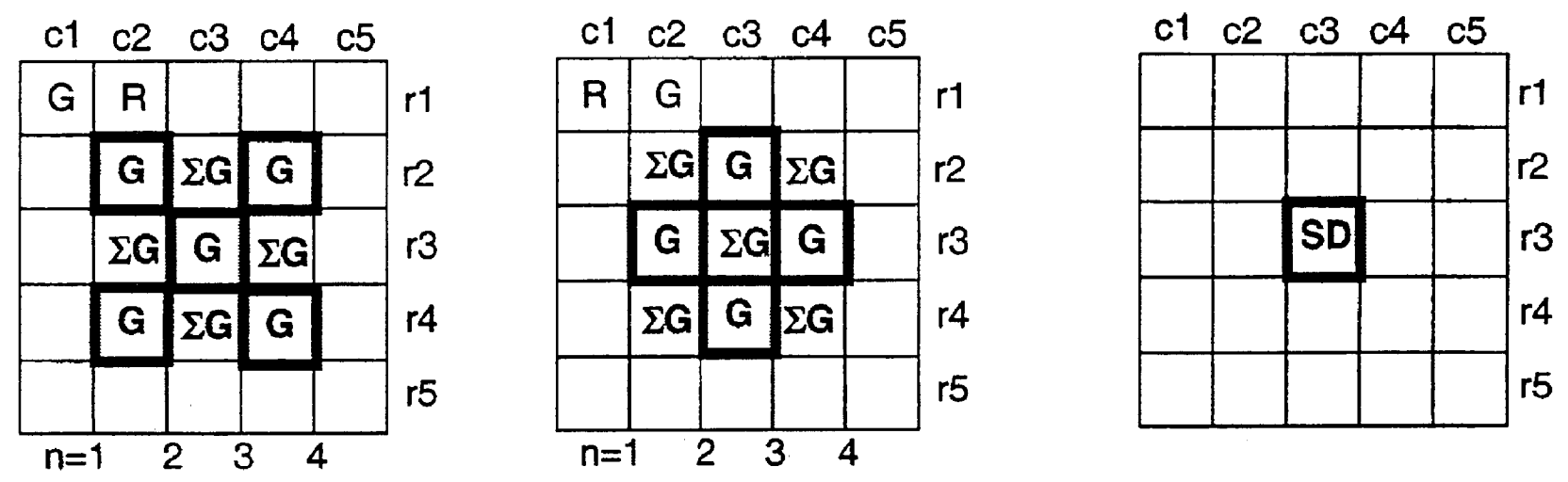
Figure 22:
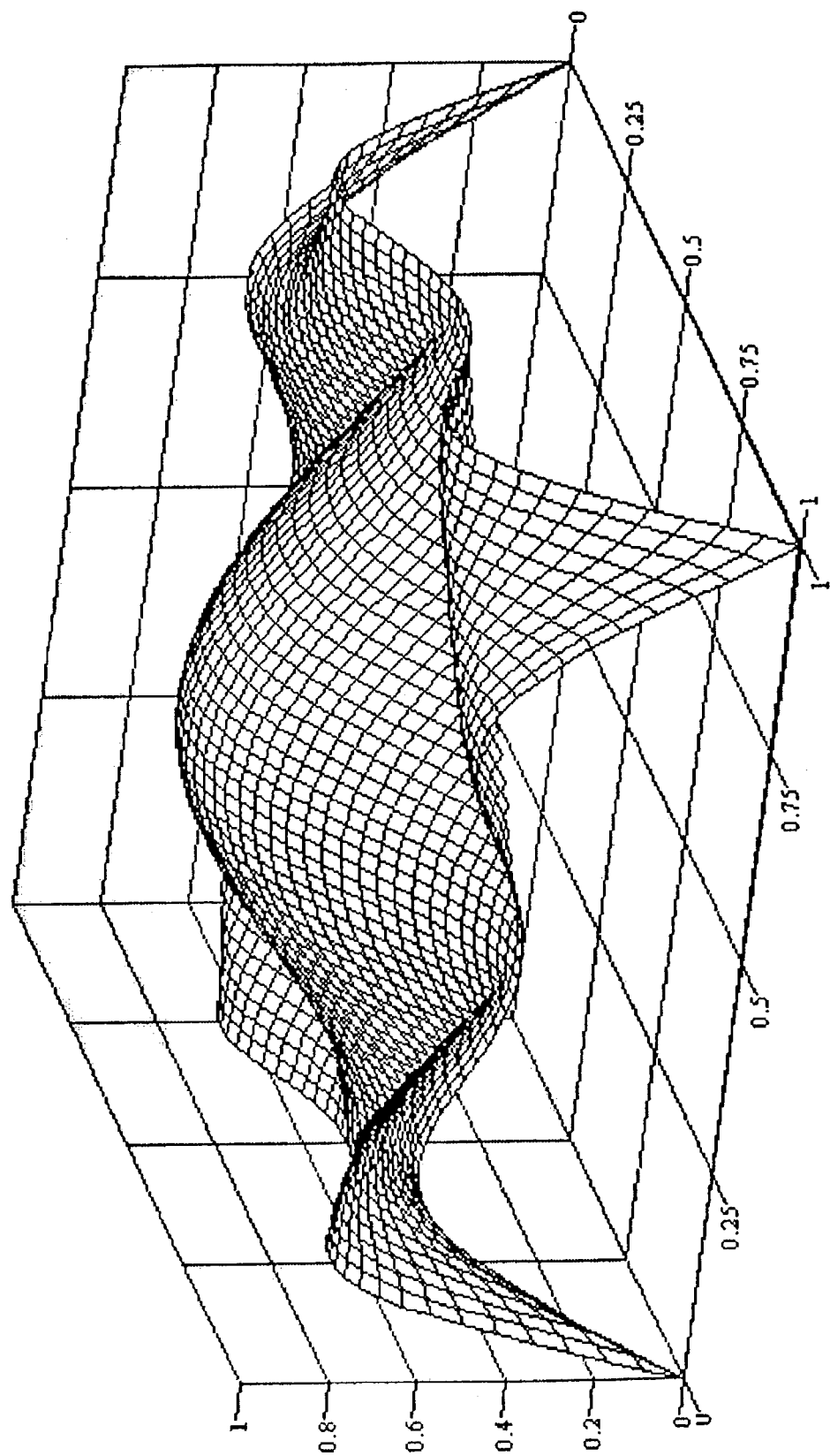
FIG. 22 shows the SD transfer characteristic using 3×3 G-ΣG color signals.

First again the SD signal will be considered for a 5×5 array with the green and sigma-green signal. In order to prevent two extra row delays when using the G-ΣG signal, a 3×3 array has been applied in stead of a 5×5 one. In FIG. 21 the realization of the SD signal is shown starting from the GR position (left) or the RG position (middle) to the final position of the SD signal (right), inclusive its proper phase match with the center of the 5×5 array. In FIG. 22 the corresponding 3D-plot is shown. That the SD transfer characteristic is not flat can be regarded as a small disadvantage because near the noise floor this transfer function will influence the measured standard deviation. Another minor disadvantage is that the SD signal suffers from green-green differences. For explanation, see FIG. 28 in the case of green present pixels. For the low pass filtered signal it is sufficient to apply the G-present pixels only over the full 5×5 array using the weights as shown in FIG. 20. Of course it is allowed to apply the ΣG pixels, but this will cost two extra row delays and is of no importance for the low pass characteristic because ΣG is already a composition of the G-present pixels. For the explanation of the lack of green-green differences in this low pass signal is referred to FIG. 27.

It may be noticed that for a memory based architecture, two extra row delays (and two extra columns) for a 5×5 G-ΣG signal are no problem at all. The latter array uses the G-ΣG signal of the middle row and middle column, with a total of 9 pixels, for generating the SD signal.

About the SD signal for a 5×5 array with the Ymux signal the following: Although the low pass filtered signal with Ymux is suitable for the standard deviation, no configuration of pixels for the SD signal can be found that fulfils the proper phase match in combination with the 1:2:1 RGB contribution.

Figure 23:
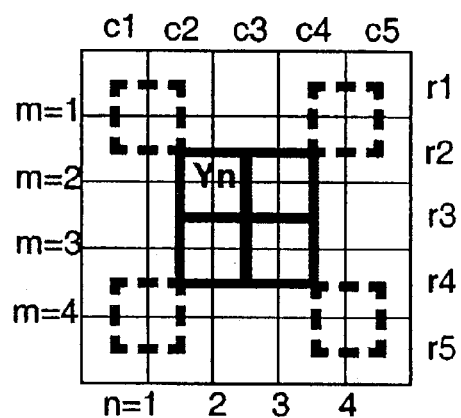
FIG. 23 shows the realization of the SD-signal for a 5×5 reconstruction array with 4 Yn pixels.
Figure 23:
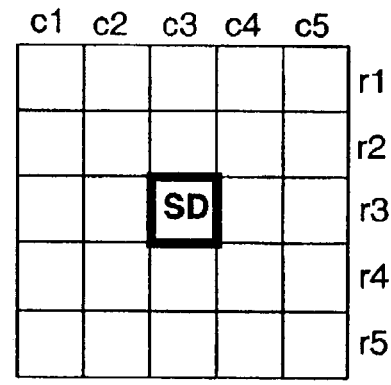
Figure 24:
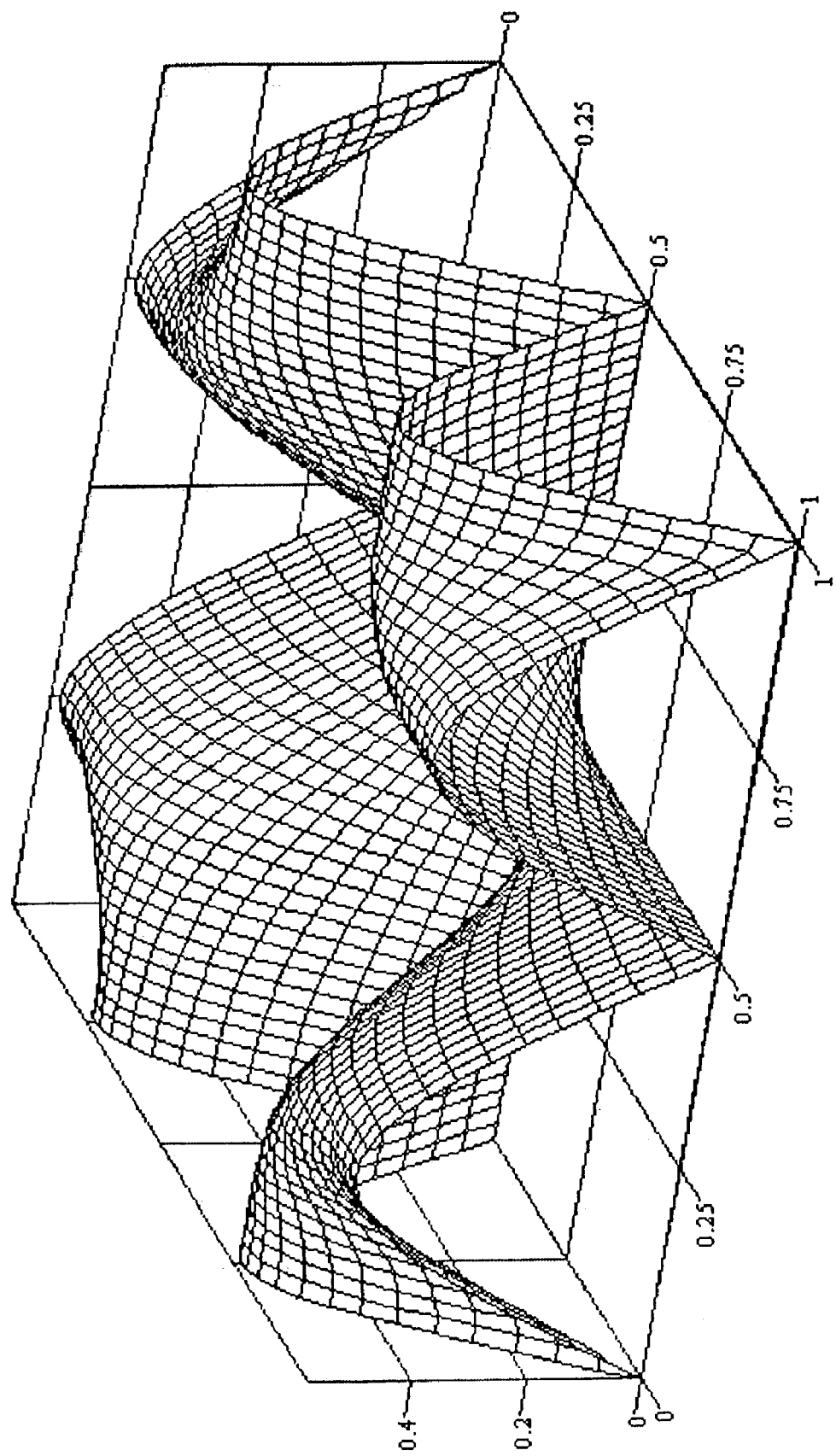
FIG. 24 shows a 5×5 SD transfer characteristic for Yn input signals.

With respect to the SD signal for a 5×5 array with the luminance signal Yn the following can be noticed. In FIG. 23 (left) is shown which Yn pixels can be used for the calculation of the standard deviation with the proper phase relation, i.e. the final position of the SD signal in the center of the 5×5 array (on the right side in FIG. 23). Inclusive the four dashed Yn pixels a strong diagonal transfer loss occurs. Therefor only the four center pixels are applied, resulting in the transfer characteristic of FIG. 24. Just like described before in relation to the third choice in case of a 6×6 array, this LNR will, besides the contour noise, also reduce the contour amplitude of frequencies near the Nyquist area.

Figure 25:
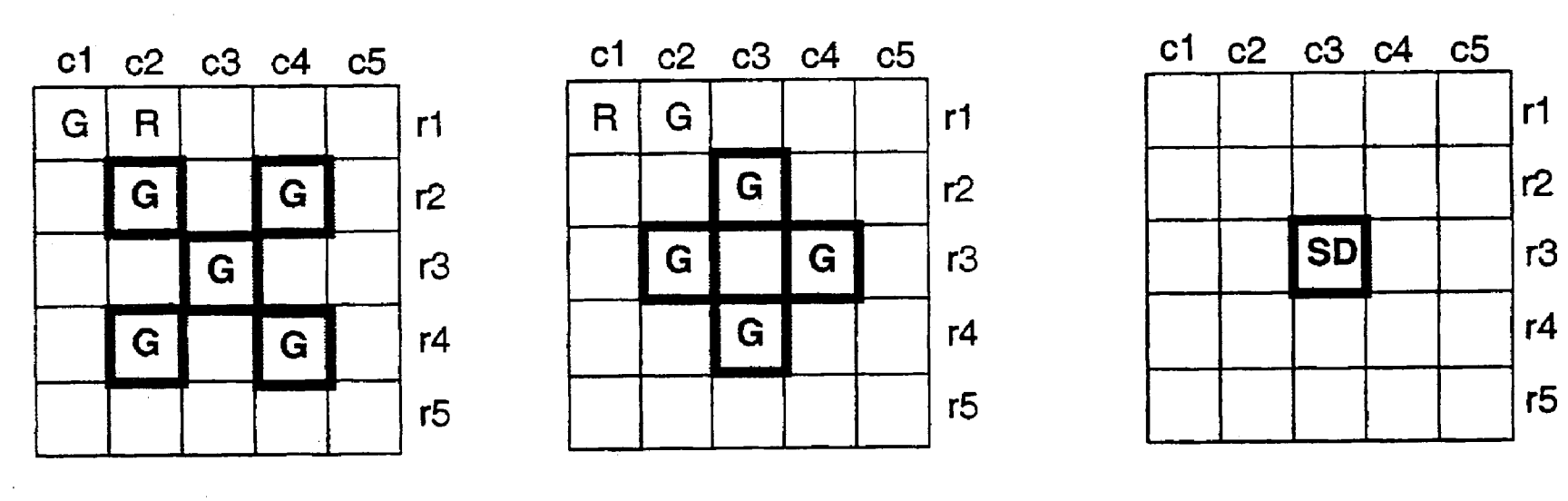

With respect to the SD signal for a 5×5 array with the green present pixels the following can be noticed. The resolution loss with Yn for SD can be prevented when using the G-present pixels as is shown in FIG. 25. For the GR start position (left) and the RG start position (middle) the total of G-present pixels is respectively 5 and 4 in order to achieve a proper phase match to the center of the array. The final position of the SD signal is in the center of the 5×5 array (see the diagram on the right side in FIG. 25). The low pass filtered signal Ylpf is realized with the same G-present signal but then available over the full 5×5 array.

Figure 26:
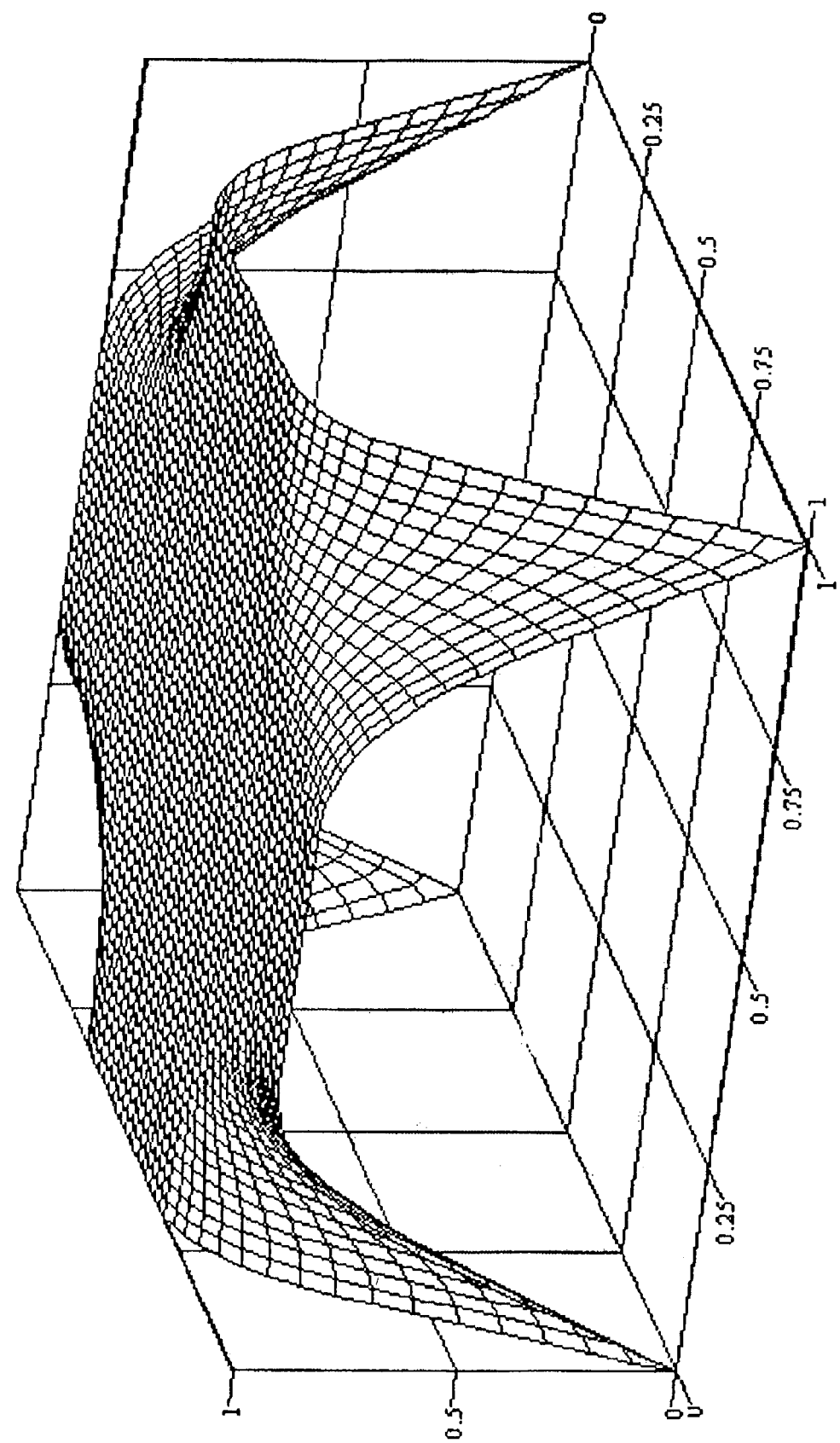
FIG. 26 shows the SD transfer characteristic for 3×3 green present signals.

In FIG. 26 the SD transfer characteristic is shown, which is flat for the higher frequencies near the Nyquist area.

Figure 27:
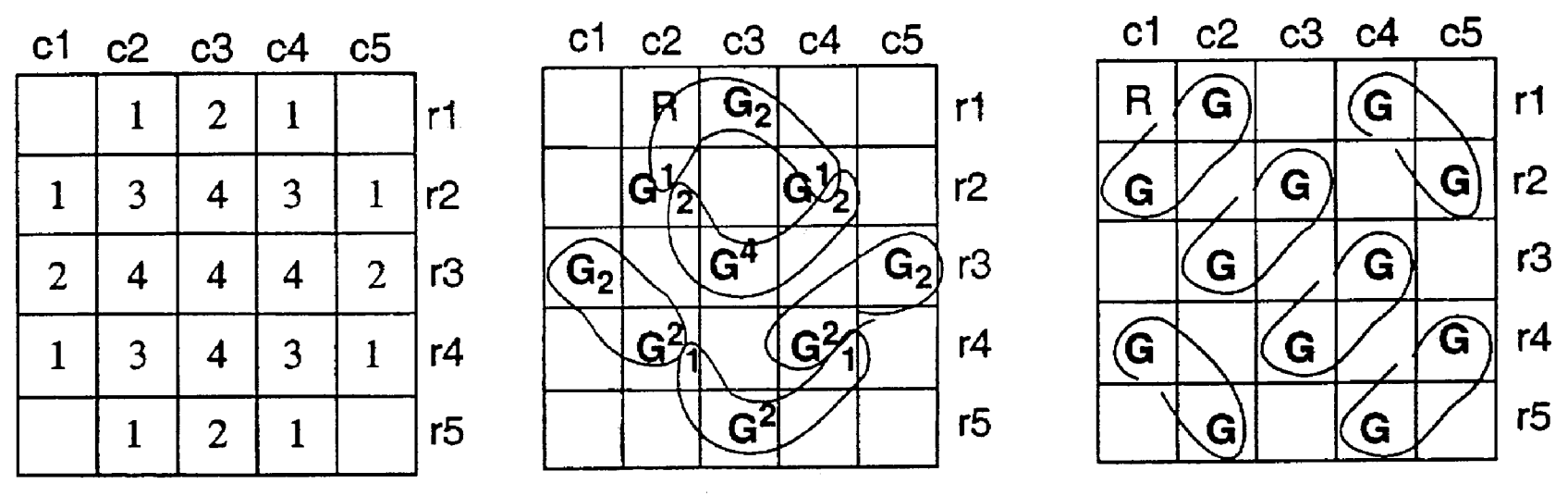
Figures 28, 31:
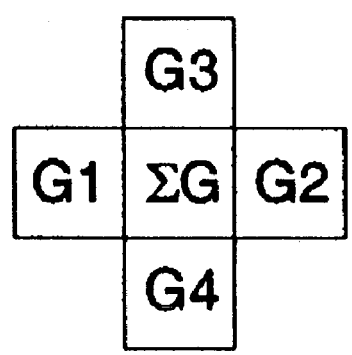
FIG. 28 shows green-green differences in the SD signal for a GR start position and the absence thereof for a RG start position.
FIG. 31 shows a sigma-green reconstruction.

Now, first the lack of green-green differences in the low pass signal will be shown. The subtraction of neighbor diagonal pixels, taking into account their filter coefficients, should result in a zero contribution. That this is true for both starting positions (GR in the middle and RG on the right) is shown in FIG. 27. In FIG. 28 is shown that the start position GR (left) is the one that will cause green-green differences in the SD signal, while the start position RG (right) is without green-green differences. Till so far there is no solution for this problem. The amplitude of the green non-uniformity of the SD signal is 3/5 times the original one.

Besides a smaller green non-uniformity, there are two reasons that make green non-uniformity in the SD signal acceptable. The first reason is that the SD signal is not directly present in the scene signal, it is a control signal. The second reason is that it controls noise, and noise will mask the green-green differences. Till so far in practice the effect of the green non-uniformity in this SD signal has not been visible.

Now LNR with Yn or G-present for a 5×3 array will be considered.

For low cost digital camera applications using a 5×3 array with 2 row delays, the conventional coring in the contour signal is very attractive because of its simplicity.

Because digital chip area continuously decreases it can become interesting to apply for a 5×3 array the LNR the proposals of FIG. 23, using the Yn-signal, and of FIG. 28, using the G-present signal. For both the realization of the SD signal fits into a 5×3 array.

Figure 29:
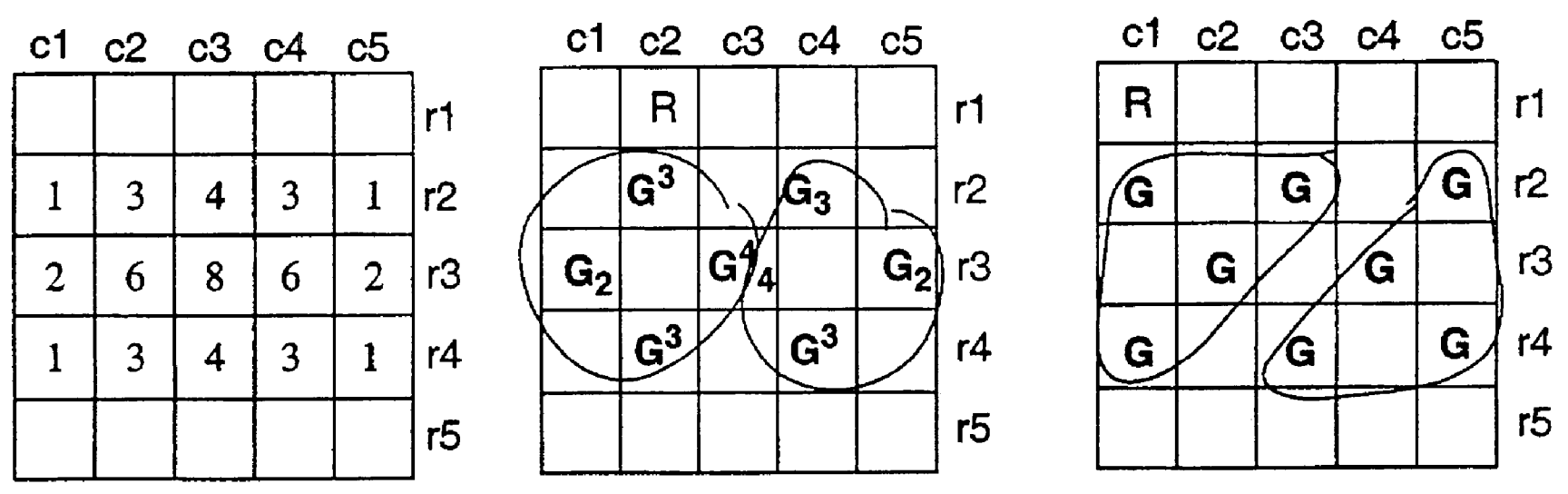

In the same way as described for the 5×5 array, a suitable low pass filter has to be defined. This can result in filter coefficients as shown on the left side of FIG. 29. For the sake of completeness is shown that, as function of the GR-start position (middle) and the RG-start position (right), there are no green-green differences in case of the use of G-present.

Figure 30:
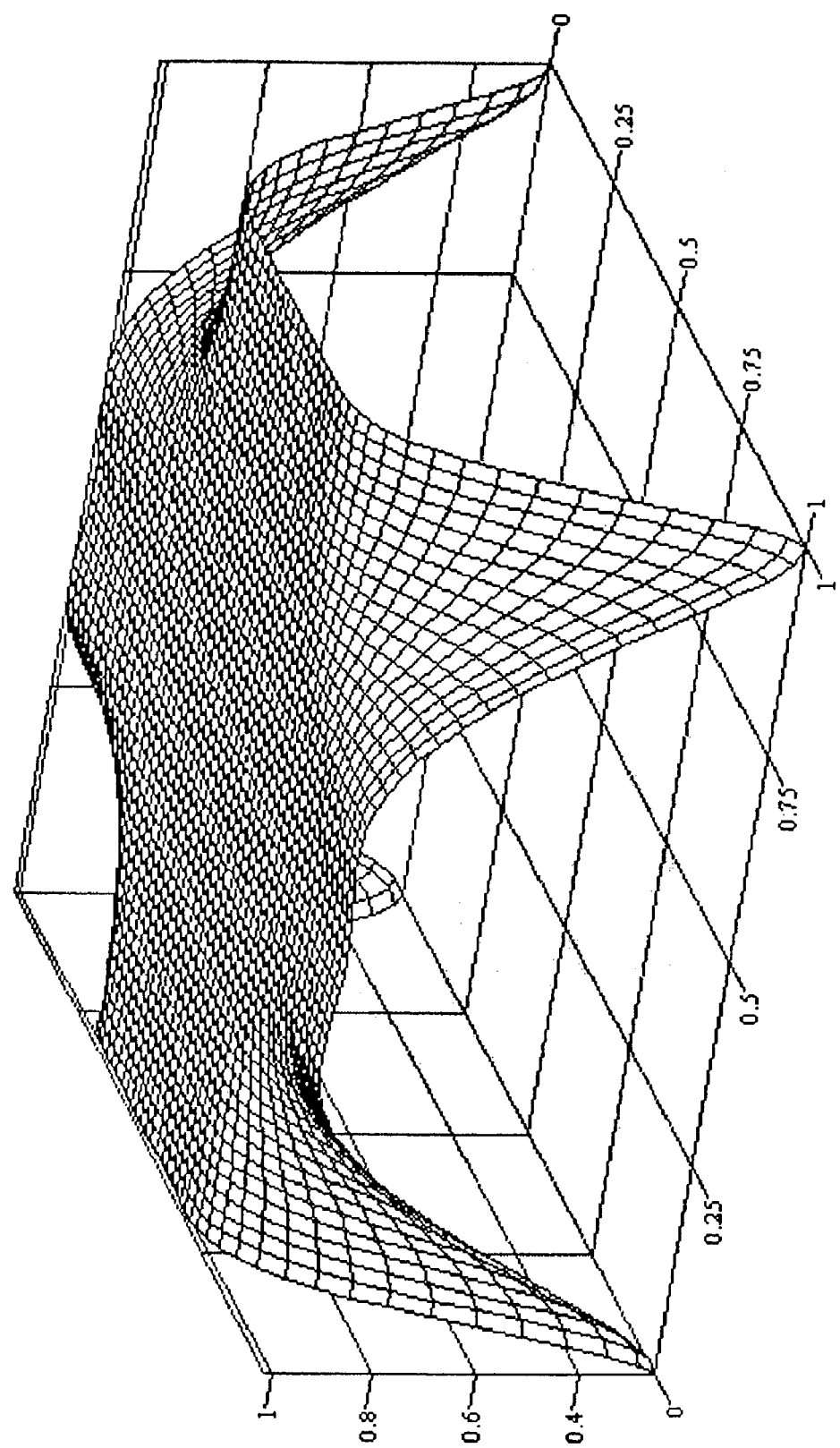
FIG. 30 shows the transfer characteristic with green present signals using a 5×3 low pass filter.

In FIG. 30 the SD transfer characteristic for the G-present pixels of FIG. 28 is shown. The SD transfer matches rather well with the one of FIG. 26.

In case of the use of the Yn-signal for the SD transfer, this 5×3 low pass filter is suited for Ymux as input signal, because the 1:2:1 RGB ratio is maintained. An example: if row 3 (r3) contains red than the low pass filtered signal Ylpf consists of 12*R, 24*G and 12*B, being 1:2:1.

From the latter part of the description the following conclusions with respect to LNR for a 5×5 and 5×3 array can be drawn.

The 3×3 G-ΣG signal does have a proper phase match. A minor disadvantage is that it does not have a preferred flat SD transfer characteristic. The red and blue edges will be less preserved than the green ones. Worst of all is that it suffers from distortions at colored edges.

The Ymux signal is not suited at all due to phase match errors and/or improper 1:2:1 RGB weights when referred to the low pass filtered signal.

The Yn signal is suited, but causes a slightly visible contour signal resolution loss near the Nyquist region. Within the Yn signal all colors are available for noise reduction.

The use of a 3×3 present green signal offers a proper phase match and a flat SD transfer characteristic. A minor disadvantage is the green non-uniformity in the SD signal. The red and blue edges will be less preserved than the green ones. No distortions in colored edges.

The SD signal generation with the Yn signal and with green present pixels are also suited for a 5×3 array.

Now the differences between LNR using a luminance or a green signal will be described.

First of all the noise of the Yn and the G-present signal will be regarded. The effective noise of the red, green and blue colors is supposed to be respectively: nsR, nsG and nsB. The amount of the noise is determined by the sensitivity of the image sensor. In case of the Yn signal, having a 1:2:1

RGB ratio and a non-correlated noise for each color, the effective noise can be represented by:

$$nsY = \sqrt{(nsR/4)^2 + (nsG/2)^2 + (nsB/4)^2}$$

Supposing that the effective noise energy of each color is equal, so nsR=nsG=nsB, the noise output of the Yn luminance signal becomes 0.613*nsG. So a contour signal, or an SD signal using Yn, has a better noise performance than a G-present signal.

For a contour array, using Yn for contour and SD, the noise of the contour and the SD signal are in balance. This is also the case for an array using G-present for contour and SD. However for an array using for example Yn for SD and G-present for contour, the measured SD-value should be amplified with a factor 1/0.613=1.63. In the opposite case, G-present for SD and Yn (or Ymux) for contour, the SD-value should be multiplied with 0.613.

What concerns the shift of the membership function as function of the amount of noise count that it is determined by the signal used for the contour. So if Yn is used for the contour signal the shift should take into account the factor 0.613, not if G-present is used.

It may be noticed that in practice for each sensor type it makes sense to adjust once the adaptation of the amplitude of the SD signal.

A second aspect to pay attention to is what happens with the colored edges if an Yn or G-present signal is applied for the calculation of the SD-value. Again an image sensor having a unity matrix is supposed. If in that case the G-present pixels are applied for the LNR then the SD function will not detect at all red and blue edges. As a consequence the maximum noise reduction will be executed on the red and blue edges, causing a (strong) amplitude loss of them. If the Yn-signal is applied then the green noise contribution has become smaller; so, less small green edges will be preserved, but in any case red and blue edges will be present. They will be less pronounced present than the green edges, due to their luminance contribution (R:G:B=1:2:1).

From the latter part of the description the following conclusions can be drawn:

The LNR for arbitrary contour filters is able to reduce the high frequency noise in low frequency areas of the final luminance output signal, while the sharpness of the edges can be improved. SN improvement in the final output signal is only possible in case of a serial contour filter.

For cameras using a parallel arbitrary contour filter, noise reduction is practically only possible in the contour signal. Noise reduction in the final output signal requires extra filters, however based on the algorithm described herein before the edges can be preserved.

For all mentioned parallel contour arrays in this report, the 6×6, the 5×5 as well as the 5×3, the calculation of the standard deviation SD is good possible with the white compensated luminance signal Yn or with the G-present pixels. So the use of the G-ΣG signal, needing a large convolution array, can be avoided in a general architecture.

The choice whether the Yn signal or the G-present pixels should be applied for the SD signal is rather difficult. It depends on the priorities of a camera manufacturer. The maintenance of the black and white colored resolution means that the G-present pixels should be chosen and that a resolution loss for red and blue colored edges should be accepted. When maintenance of the resolution of colored edges has the priority, then the Yn signal should be chosen, but the resolution loss in black and white high frequency components should be accepted.

When using Yn for SD, the 6×6 architecture will have less resolution loss near the Nyquist region than the 5×5 array, due to the fact that besides contour another high frequency component (Yn−Ylf) is added to the RGB signals.

For normal scenes the differences between an LNR for parallel contour using the Yn signal or the G-present pixels for SD, are less visible than in the artificial zone plate scene as used here.

It is important to be aware of the fact that the noise reduction in the parallel contour signal will be much less visible in case of a heavy sensor matrix. This is easy to understand because the noise reduction happens on a signal that has passed neither the matrix nor the gamma circuits. A heavy matrix will cause so much noise that it will mask the improvement in the contour signal.

Now, a sigma-green example will be given for LNR in a digital camera with a parallel contour reconstruction using dedicated row delays in stead of a memory based architecture. Further it is supposed that the reconstruction array has a size of 5×3 or 5×5 pixels (5 horizontal pixels and 3 or 5 vertical ones).

In FIG. 31 can be seen that for the realization of the sigma-green (ΣG=¼(G1+G2+G3+G4)) signal for local noise reduction two extra 'green' row delays are required. One extra row is needed at the top and one at the bottom of the array in order to have the ΣG signal available in every row of the 5×3 or 5×5 array. So, due to the LNR, these reconstruction arrays will increase to a size of respectively 7×5 and 7×7.

Figure 32:
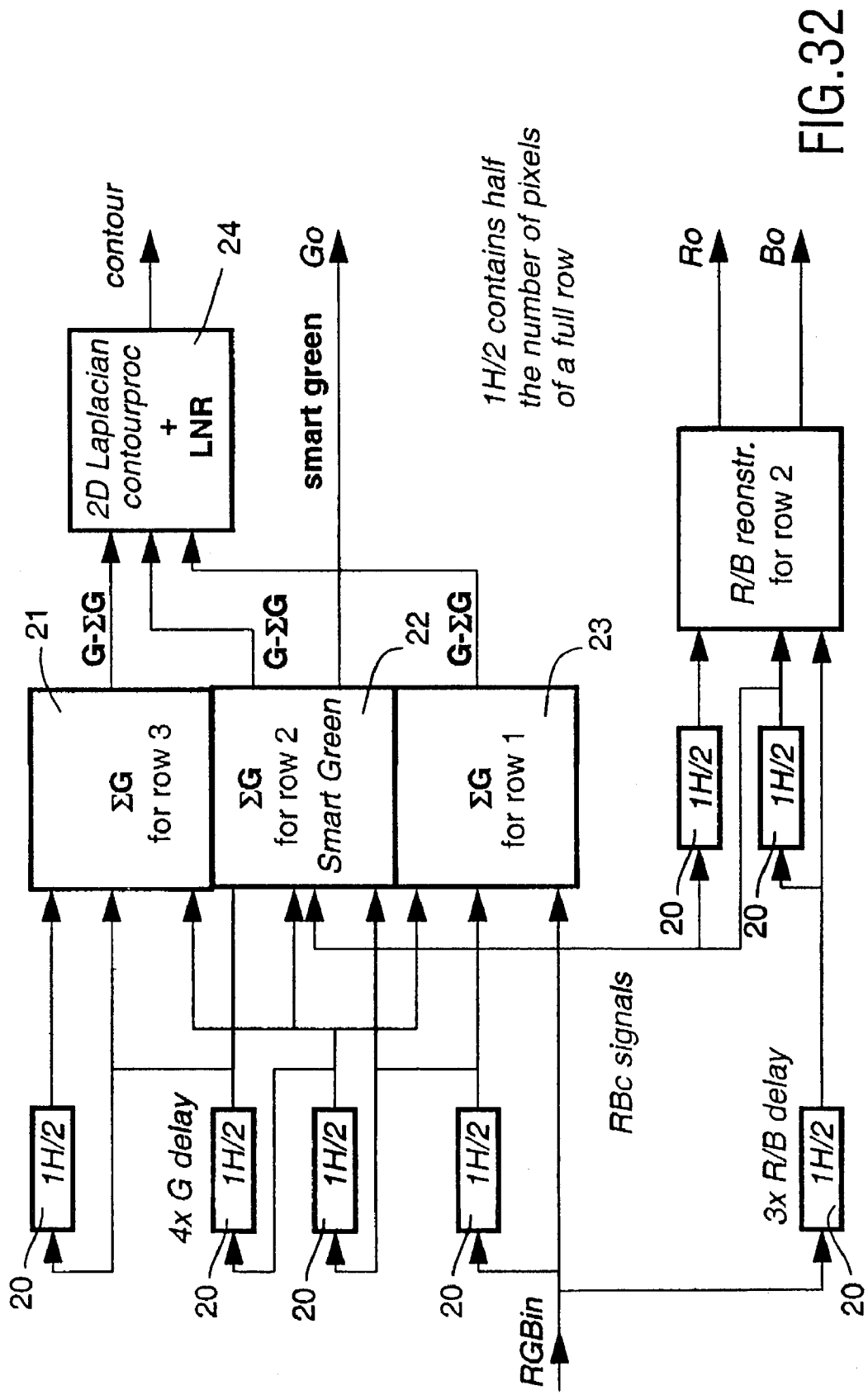
FIG. 32 shows an example of RGB reconstruction and contour processing with LNR.

FIG. 32 shows a preferred architecture, which includes the use of LNR. FIG. 32 is a copy of an earlier known embodiment with modifications when using ΣG in stead of smart green signals. Four H/2 green row delays, with a length of half the number of pixels of a full row and indicated by blocks 20, offer the ΣG reconstruction for the contour with LNR. Also for the red/blue pixels only row delays with a size of H/2 are used, resulting in-3.5 full row delays in stead of 2 for the basic reconstruction.

In all three green reconstruction blocks 21, 22 and 23 the ΣG-signal is reconstructed and the green-green differences are eliminated. In stead of a luminance signal, three G-ΣG signals are offered to block 24 for two-dimensional for contour processing in combination with LNR.

Only in the middle green block 22 the smart green signal is realized. Because two of the three smart green reconstructions have become superfluous, also two interconnections via the R/B delays have been left out of the diagram of FIG. 32. Now an example will be given for noise reduction with edge preservation in a smartgreen3 environment.

Figure 33:
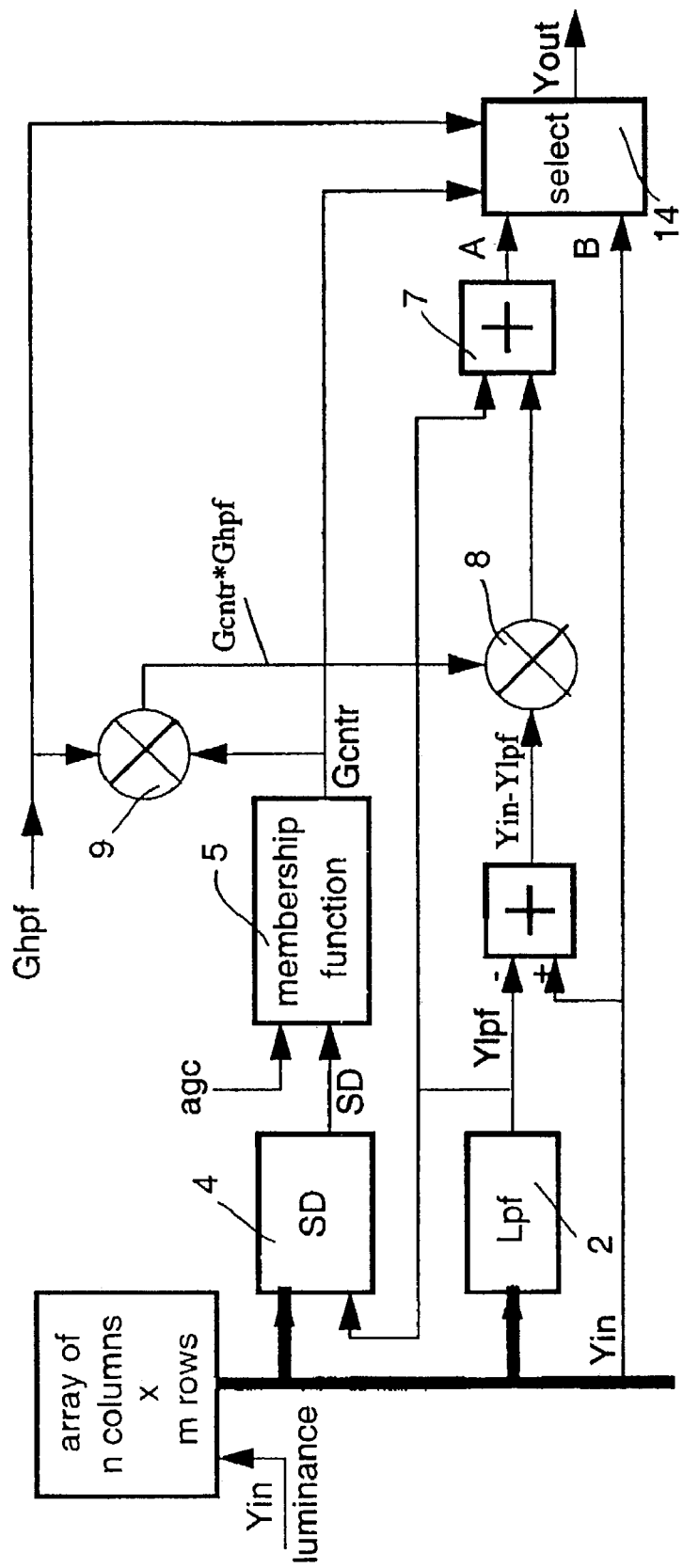
FIG. 33 shows a block diagram for luminance noise reduction with edge preservation.

Given is formula (E) concerning noise reduction with edge preservation:

if $Gcntr < 1/Ghpf$ then $Yout = Gcntr*Ghpf*(Yin-Ylpf) + Ylpf$ else $Yout = Yin$ In FIG. 33 first a general diagram for a luminance signal is shown. This Figure has been derived from FIG. 3 by leaving out the contour signal part of it.

Figure 34:
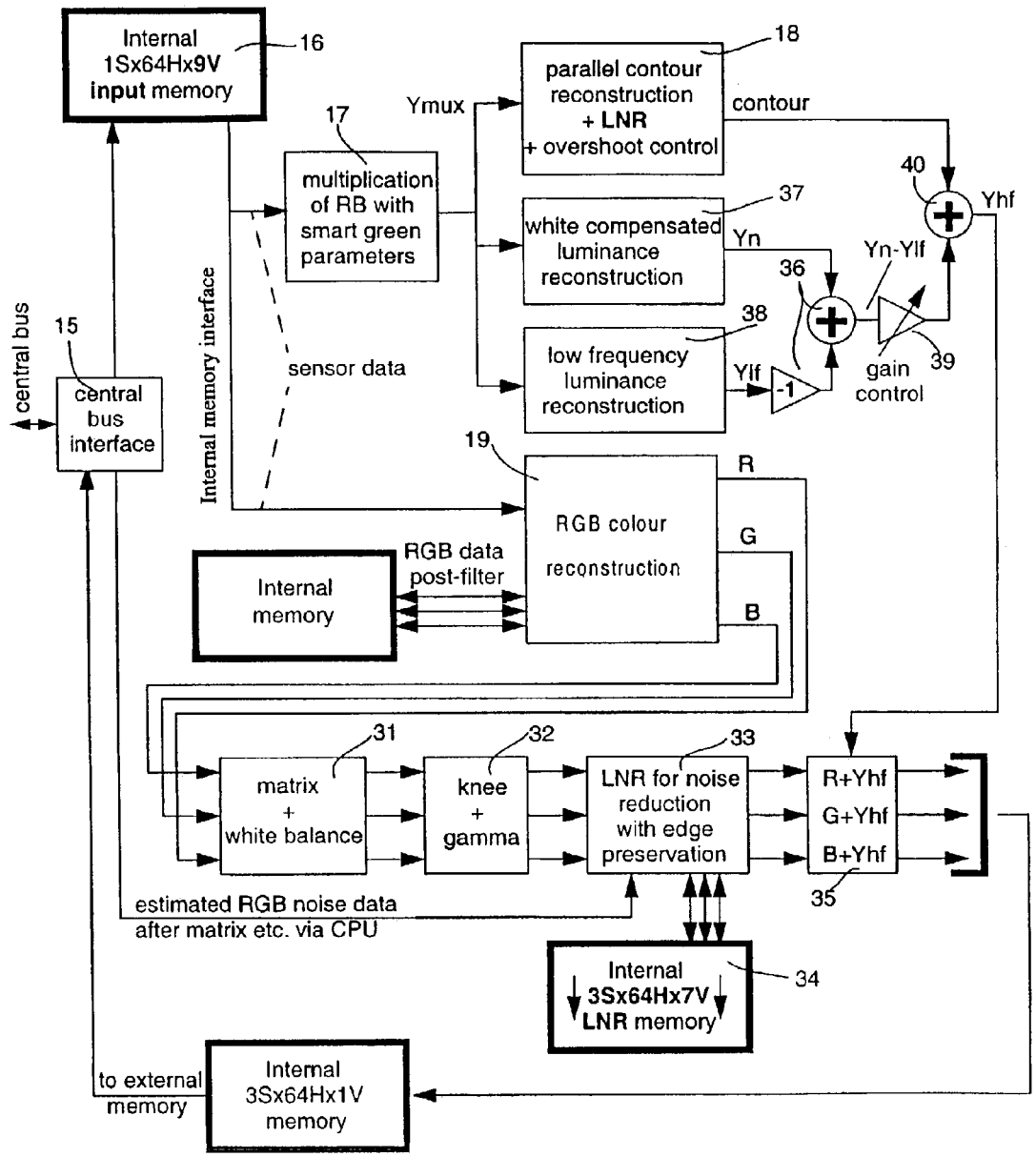
FIG. 34 shows a block diagram to illustrate noise reduction with edge preservation in a smartgreen3 environment.

In case of a camera with parallel contour it is possible to apply noise reduction with edge preservation after the reconstruction and the processing (matrix, white balance, knee and gamma). In FIG. 34 a known smartgreen3 architecture is used as an example of how to implement it.

Figure 35:
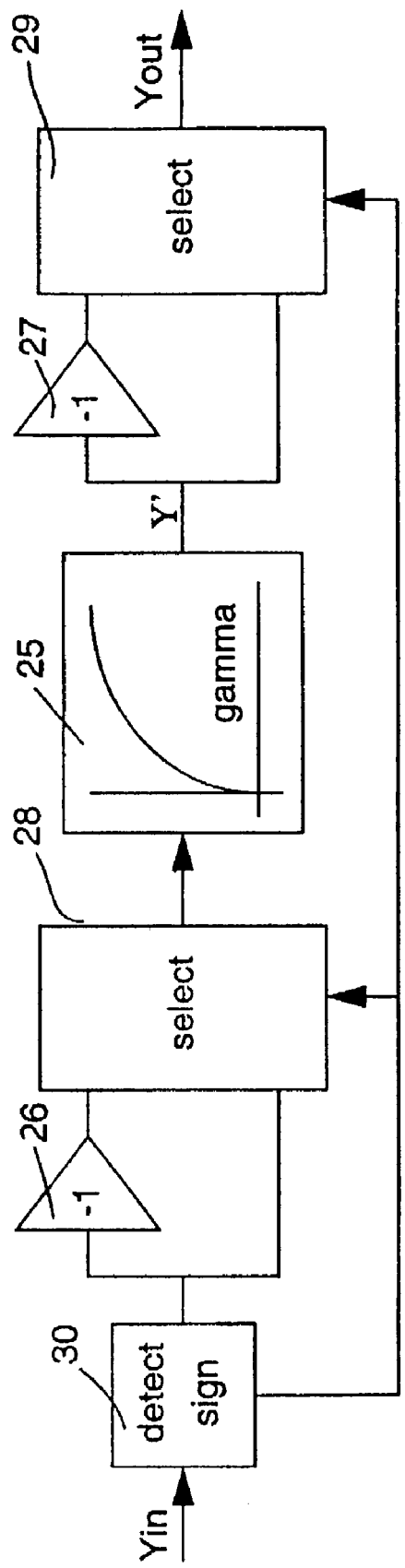
FIG. 35 shows a block diagram to clarify preventing of clipping of negative signals by gamma processing.

Given the default noise of the image sensor at a certain illumination on that sensor, it is possible to predict by means of a CPU the amount of noise after the gamma processing in the RGB signals. The increase of the noise as function of the automatic gain control (age) of the camera can be taken into account as well. It is also possible to let the CPU measure the amount of noise in a reference black window of the image sensor after the gamma processing. In that case negative noise signals should pass the gamma circuit 35 otherwise the measurement is not representative. With an inversion before and after the gamma circuit by means of inverters 26 and 27 and selection circuits 28 and 29 and depending on the sign bit, detected in the unit 30, this is possible as is shown in FIG. 35. If Yin is negative then Yin is inverted before it is offered to the gamma circuit. In order to restore the sign again also the gamma output signal Y' has to be inverted.

It may be noticed that too large predicted noise differences between the RGB signals will cause a difference in the shift of the SD membership transfer for RGB noise reduction as well. As a consequence colored edges can occur. Therefor the CPU should limit the differences in the shifts of the RGB membership functions.

A more detailed description of FIG. 34 will follow now.

The RGB-, Ylf-, Yn- and contour-reconstruction part has been copied from an earlier described smartgreen3 architecture. The parallel contour reconstruction uses the special LNR case as has been described with reference to FIGS. 3 (with the contour signal=0) and 4, i.e. the special case of noise reduction in combination with edge preservation. The sum of the contour signal, obtained via block 19, and the (Yn-Ylf) signal, obtained via the white compensated luminance reconstruction block 37, the low frequency luminance reconstruction block 38, the combination unit 36 and the (Yn-Ylf)-gain control unit 39, and the combination unit 40, forms the high frequency signal Yhf, which is used for the processing of the RGB signals as described later on.

After the matrix, white balance, knee and gamma processing in the blocks 31 and 32, the noise reduction with edge preservation takes place on the RGB signals in block 33. The processing indicated in the block diagram of FIG. 33 will be applied three times, once for each RGB color.

The size of the noise reducing low pass filter can be defined as function of the desired noise improvement. Here a 7×7 array, represented by the internal (3S×64H×7V) LNR memory 34, has been applied in order to maintain a proper phase relation with the contour filter. An even by even low pass filter, for example 6×6, is not suited because then a phase error with the parallel contour signal will occur. After the LNR with edge preservation the reconstructed Yhf signal will be added in block 35 to each of the RGB signals. In FIG. 34 has been chosen for noise reduction of the RGB signals, because it can be tuned as function of the noise of each color. It is however also possible to apply noise reduction on each of the Yuv (luminance and color difference) signals. The Yhf signal then will be added to the luminance signal (Y=0.3*R+0.59*G+0.11*B) only.

Figure 36:
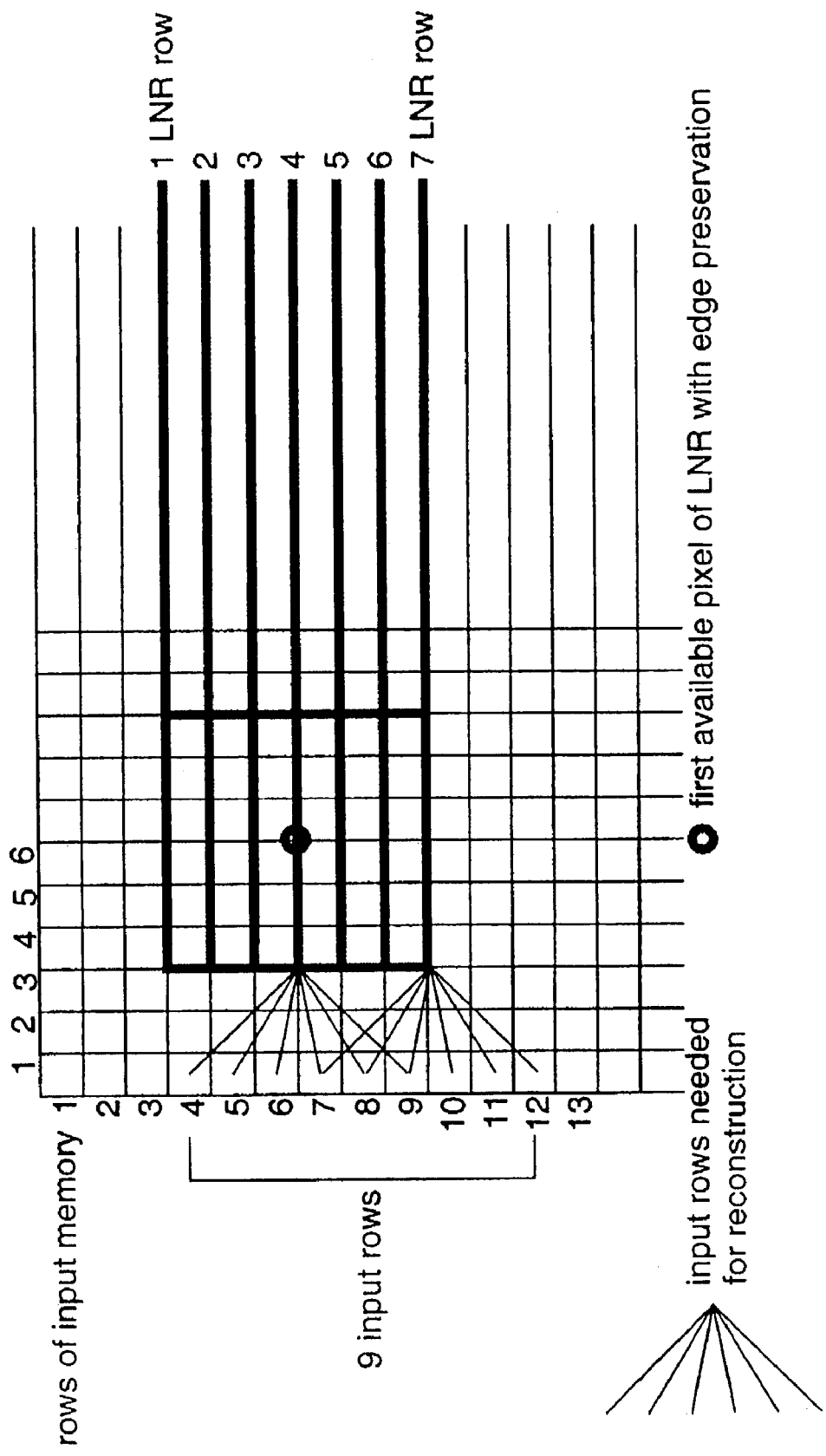
FIG. 36 shows the number of rows needed for the input memory.
Figure 37:
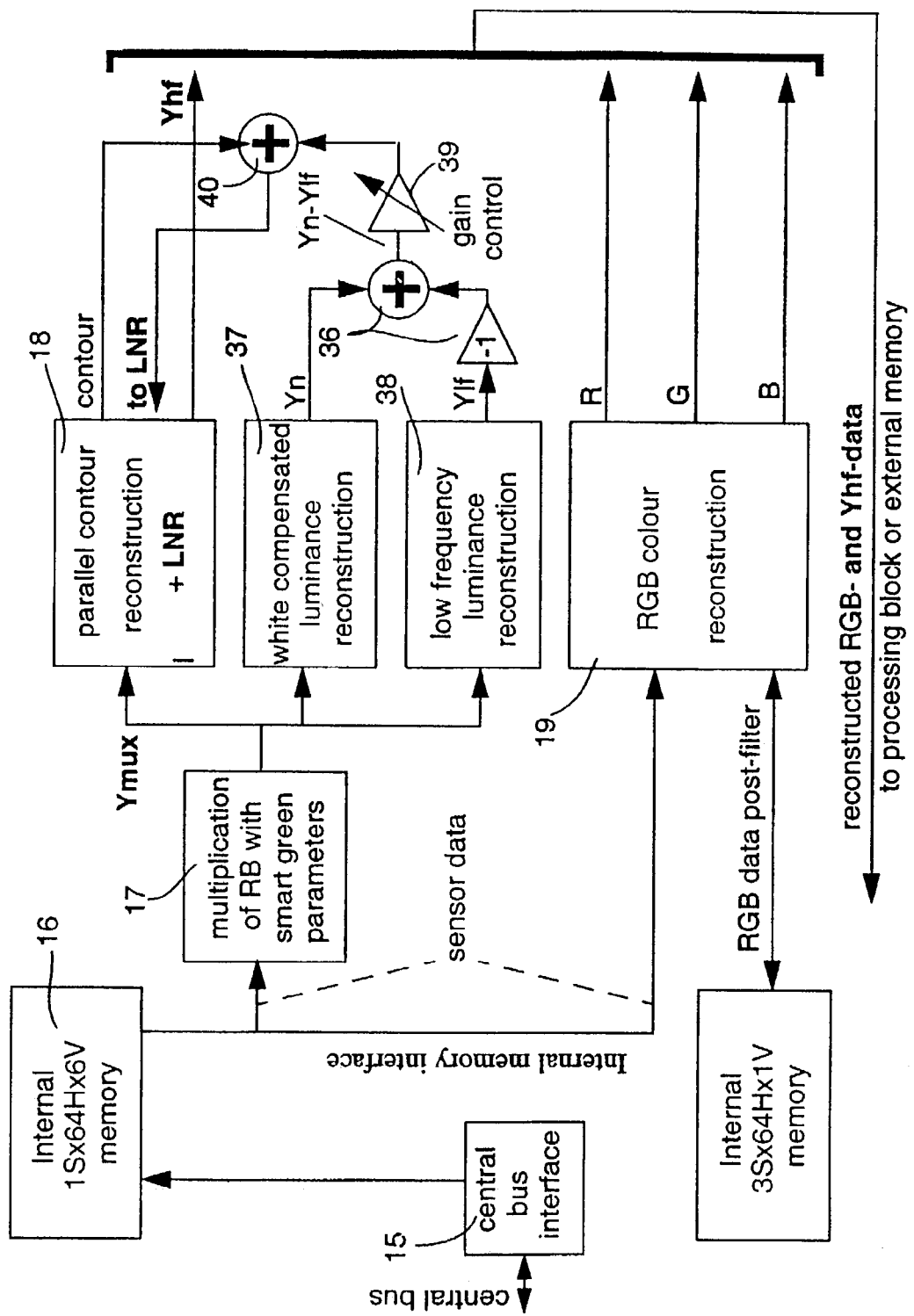
FIG. 37 shows a block diagram for smartgreen3 reconstruction with parallel contour filtering and LNR on all high frequency signals.

In order to obtain the low pass filtered RGB signals as well as the desired pixels for the SD signal, the internal (3S×64H×7V) memory 34 should be completely filled with RGB data. This means that the last row, row 7 of the internal (3S×64H×7V) LNR memory should be the actual RGB signal reconstruction row. Supposing that both, the (1S×64H×9V) input memory 16 as well as the (3 S×64H×7V) LNR memory 34, are able to shift row data vertically, only row 7 need to be filled. By shifting the data of all six previous rows one row, all RGB data in the (3S×64H×7V) LNR memory 34 will be available. After that, on the position of row 4 of the internal LNR memory 34, the noise reduction with edge preservation on the RGB signals as well as the Ylf-, Yn- and contour-signal reconstruction are executed. Finally the Yhf signal is added to the RGB signals and send back to the external memory. This processing sequence is an example of how to realize the noise reduction with edge preservation in a smartgreen3 environment. There are of course also other methods. The consequence of all this is that a larger input memory is needed than the earlier known (1S×64H×6V) memory. The input memory has to be increased to 9 vertical rows, so it becomes (1S×64H×9V). In FIG. 36 is explained why 9 input rows are needed. The first available pixel of LNR with edge preservation (indicated by a black dot in FIG. 36) is between input row 6–7 and input column 6–7. For row 7 of the LNR the data of input rows 7–12 is needed. For the Ylf-, Yn- and contour reconstruction on row 4 of the LNR, the data of input row 4–9 is needed. The total needed input rows ranges from row 4–12, so 9 rows the data of input row 13 is fetched from the external memory, the data of LNR row 1 is lost and of input row 4 as well. All other rows are shifted one position such that the previous LNR row 2 becomes the new LNR row 1. The very same counts for the input memory. In a third example LNR for smartgreen3 on the total of high frequency signals will be described. In FIG. 37, constituted by blocks already indicated in FIG. 34, it is shown how LNR can be executed on the total of the smartgreen3 high frequency signals. The sum of the contour signal and the (Yn−Ylf)-signal is offered to the LNR and then send to the processing block or the external memory. When LNR is acting on contour only, the (Yn-Ylf) signal masked the LNR contour loss when using Yn for the standard deviation. When using all smartgreen3 high frequency information, the contour loss in the Nyquist region will be larger.

The invention is not restricted to the preferred embodiments shown in the Figures. Many alternatives for performing the functions of the various algorithms are possible. The embodiments described above are realized by algorithms, at least part of which may be in the form of a computer program capable of running on signal processing means in a video-apparatus or a camera.

The invention claimed is:

1. Digital image enhancing system for processing pixel contour data, comprising a contour filter, means for edge processing and for local noise reduction to reduce the amount of noise in a pixel luminance or color signal (Sin), means to apply a control signal (Ghpf) indicating the gain of a contour signal, and means to apply a control signal (Gcntr) indicating the gain of the contour as a function of local noise in a picture, characterized in that the means for edge processing and local noise reduction are arranged such that an output signal (Sout) is supplied in response to said input signal (Sin), to a low pass filtered input signal (Slpf) derived therefrom, and to the contour filter output signal (contour) and the above control signals according to the relation:

$Sout = Gcntr*Ghpf(Sin-Slpf)+Slpf$ if $Gcntr*Ghpf<1$, and $Sout = Sin+(Ghpf*Gcntr-1)*contour$ else.

2. Digital image enhancing system according to claim 1, characterized in that, in order to obtain noise reduction in combination with edge preservation, the contour filter is abandoned.

3. Digital image enhancing system for processing pixel data, comprising means for edge processing and for local noise reduction to reduce the amount of noise in a pixel luminance signal (Sin), means to apply a control signal (Ghpf) indicating the gain of a contour signal, and means to apply a control signal (Gcntr) indicating the fade position between the luminance signal and a low pass luminance signal as a function of local noise in a picture, characterized in that the means for edge processing and local noise reduction are arranged such that an outputsignal (Sout) is supplied in response to said input signal (Sin), to a low pass filtered input signal (Slpf) derived therefrom and to the above control signals according to the relation:

$Sout = Gcntr*Ghpf(Sin-Slpf)+Slpf$ if $Gcntr*Ghpf<1$, and $Sout=Sin$ else.

4. Digital image enhancing system according to claim 1, characterized in that the minimum value Gcntr(min) of Gcntr is chosen such that Gcntr(min).*Ghpf=1 and that the means for edge processing and local noise reduction are arranged such that an outputsignal (Shpf) is supplied in response to said input signal (Sin), to a low pass filtered input signal (Slpf) derived therefrom, and to the contour filter output signal (contour) and the above control signals according to the relation:

$Shpf=(Ghpf*Gcntr-1)*contour$ if $Gcntr*Ghpf \geq 1$ and $Shpf=0$ else.

5. Digital image enhancement system according to claim 1, characterized in that moans are provided for measuring the standard deviation in the input signals, which input signals are formed by white compensated luminance signals Yn, or present qreen signals G, or a combination of green and sigma green signals G-ΣG, and are obtained via a 6×6, 4×4, 5×5 or 5×3 reconstruction array of pixels.

6. Digital image enhancing system according to claim 5, characterized by a low pass filter via which the input signals are obtained from said reconstruction arrays of pixels, said low pass filter being constituted by adding 2×2 unity low pass filters within the area of said reconstruction array of pixels, starting in the middle.

7. Digital camera comprising a digital image enhancing system according to claim 1.

* * * * *